(12) United States Patent
Rajkumar et al.

(10) Patent No.: US 8,510,644 B2
(45) Date of Patent: Aug. 13, 2013

(54) OPTIMIZATION OF WEB PAGE CONTENT INCLUDING VIDEO

(75) Inventors: Nareshkumar Rajkumar, San Jose, CA (US); Gregory Allan Funk, San Francisco, CA (US); Theodore Kent Hamilton, Küsnacht (CH); Vincent Gatto, Jr., San Francisco, CA (US)

(73) Assignee: Google Inc., Mountain View, CA (US)

( * ) Notice: Subject to any disclaimer, the term of this patent is extended or adjusted under 35 U.S.C. 154(b) by 58 days.

(21) Appl. No.: 13/277,381

(22) Filed: Oct. 20, 2011

(65) Prior Publication Data

US 2013/0104024 A1   Apr. 25, 2013

(51) Int. Cl.
*G06F 17/00* (2006.01)

(52) U.S. Cl.
USPC .......................................................... 715/201

(58) Field of Classification Search
USPC .............................. 715/201, 234, 255
See application file for complete search history.

(56) References Cited

U.S. PATENT DOCUMENTS

| 7,746,378 | B2 * | 6/2010 | Shu et al. ...................... 348/143 |
| 8,180,667 | B1 * | 5/2012 | Baluja et al. ............... 705/14.19 |
| 2005/0223021 | A1 | 10/2005 | Batra et al. |
| 2005/0278648 | A1 | 12/2005 | Taylor |
| 2005/0283730 | A1 | 12/2005 | Uyttendaele et al. |
| 2006/0257048 | A1 * | 11/2006 | Lin et al. ...................... 382/276 |
| 2007/0038931 | A1 | 2/2007 | Allaire et al. |
| 2007/0300157 | A1 * | 12/2007 | Clausi et al. .................. 715/719 |
| 2008/0270163 | A1 * | 10/2008 | Green ............................... 705/1 |
| 2009/0070163 | A1 * | 3/2009 | Angell et al. ..................... 705/7 |
| 2009/0164601 | A1 * | 6/2009 | Swartz .......................... 709/217 |
| 2009/0204481 | A1 * | 8/2009 | Navar et al. ..................... 705/10 |
| 2009/0278937 | A1 * | 11/2009 | Botchen et al. ............... 348/169 |
| 2009/0288011 | A1 * | 11/2009 | Piran et al. ..................... 715/720 |
| 2010/0007738 | A1 * | 1/2010 | Lehnert ......................... 348/159 |
| 2010/0010884 | A1 * | 1/2010 | Cohee et al. ............... 705/14.12 |
| 2010/0165112 | A1 * | 7/2010 | Scanlon et al. ............... 348/169 |
| 2010/0220592 | A1 * | 9/2010 | Pan et al. ...................... 370/232 |

(Continued)

OTHER PUBLICATIONS

International Search Report and Written Opinion for PCT/US2012/61336, Jan. 4, 2013, 12 pages.

*Primary Examiner* — Laurie Ries
(74) *Attorney, Agent, or Firm* — Patent Law Works LLP

(57) ABSTRACT

A system and method for optimizing content of a web page is disclosed. The system comprises a configuration analysis module, a request analysis module, an analytics module and an optimization module that are communicatively coupled to each other. The configuration analysis module receives first and second sets of web interaction data associated with a web page and determines first and second content configurations for the first and second sets of web interaction data, respectively. The request analysis module receives first and second requests for the first and second content configurations, respectively, and extracts a first set of event data from the first request and a second set of event data from the second request. The analytics module generates a first set and a second set of video-aware analytics data. The optimization module optimizes the content of the web page based at least in part on video-aware analytics data.

17 Claims, 23 Drawing Sheets

(56) References Cited

U.S. PATENT DOCUMENTS

| | | | |
|---|---|---|---|
| 2010/0246944 A1* | 9/2010 | Yang et al. | 382/165 |
| 2010/0251128 A1* | 9/2010 | Cordasco | 715/736 |
| 2011/0082915 A1* | 4/2011 | Carr et al. | 709/219 |
| 2011/0099195 A1* | 4/2011 | Patwardhan et al. | 707/769 |
| 2011/0202562 A1* | 8/2011 | Bloch et al. | 707/776 |
| 2011/0211070 A1* | 9/2011 | Shu et al. | 348/143 |
| 2011/0263946 A1* | 10/2011 | el Kaliouby et al. | 600/300 |
| 2011/0279641 A1* | 11/2011 | Wang et al. | 348/42 |
| 2012/0063641 A1* | 3/2012 | Venkatesh et al. | 382/103 |
| 2012/0130774 A1* | 5/2012 | Ziv et al. | 705/7.39 |
| 2012/0179742 A1* | 7/2012 | Acharya et al. | 709/202 |
| 2012/0224629 A1* | 9/2012 | Bhagavathy et al. | 375/240.08 |

* cited by examiner

OPTIMIZATION OF WEB PAGE CONTENT INCLUDING VIDEO

BACKGROUND

1. Technical Field

The present disclosure generally relates to video analysis and, more specifically, optimizing content of a web page that includes video data.

2. Background

Entities that publish content, such as video data, to one or more websites typically desire analytics data about the published content. For example, if video data is published to a website, the publishers may seek information about the number of times the video data is viewed and information describing the effect of the video data on one or more web pages from the website. Additionally, the publisher may also seek to optimize content in a web page to attract users. However, existing solutions for web page content optimization only considers optimizing verbal description contents such as headlines, news and stories, etc., without considering the effect of video data on the optimization.

Existing solutions have numerous problems. First, they fail to optimize content of a web page embedded with a video. For example, existing solutions do not provide any mechanism for testing the effect of video data on a web page. Second, existing solutions also fail to obtain users' interactions to the content of the web page including the video. Third, since the existing solutions fail to optimize web page content including a video, it is impossible for the existing solutions to generate any report describing the effect of video data on the web page and how users respond to the content of the web page including the video.

SUMMARY

Embodiments disclosed herein provide a system and method for optimizing content of a web page. A web page is a collection of one or more related pages of web content. The system comprises a configuration analysis module, a request analysis module, an analytics module and an optimization module that are communicatively coupled to each other. The configuration analysis module receives a first set and a second set of web interaction data from a web page, respectively. The configuration analysis module determines a first content configuration for the first set of web interaction data and a second content configuration for the second set of web interaction data. The request analysis module receives a first request associated with the first content configuration and a second request associated with the second content configuration. The request analysis module extracts a first set of event data from the first request and a second set of event data from the second request. The analytics module generates a first set of video-aware analytics data using the first set of web interaction data and the first set of event data. The analytics module also generates a second set of video-aware analytics data using the second set of web interaction data and the second set of event data. The optimization module optimizes the content of the web page based at least in part on the first set and the second set of video-aware analytics data.

The features and advantages described herein are not all-inclusive and many additional features and advantages will be apparent to one of ordinary skill in the art in view of the figures and description. Moreover, it should be noted that the language used in the specification has been principally selected for readability and instructional purposes, and not to limit the scope of the subject matter disclosed herein.

BRIEF DESCRIPTION OF THE DRAWINGS

Embodiments are illustrated by way of example, and not by way of limitation in the figures of the accompanying drawings in which like reference numerals are used to refer to similar elements.

DETAILED DESCRIPTION

Figure 1:
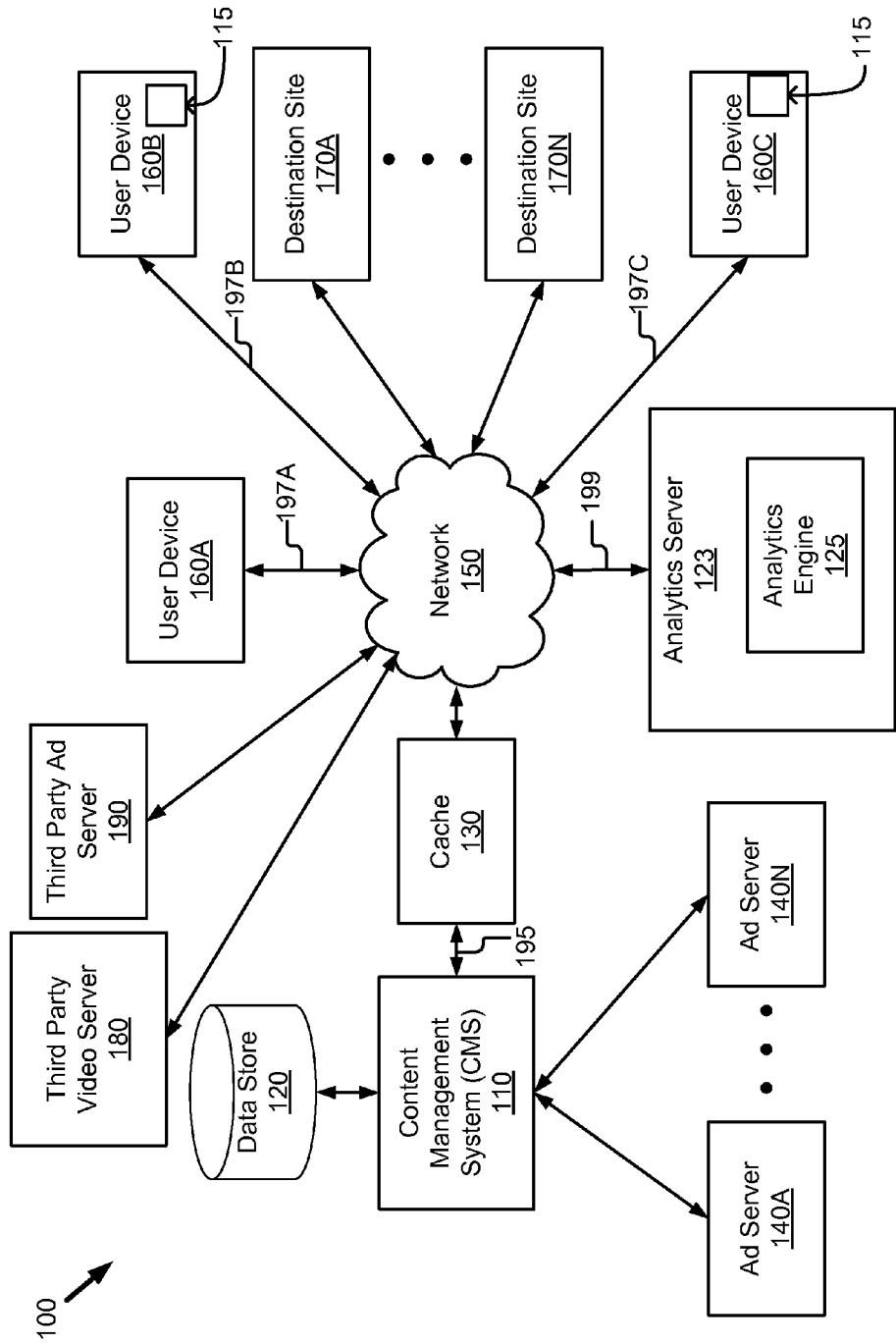
FIG. 1 is a high-level block diagram illustrating one embodiment of a computing environment for optimizing content of a web page including a video.

A system and method for optimizing content of a web page including a video is described below. In the following description, for purposes of explanation, numerous specific details are set forth to provide a thorough understanding of the various embodiments. However, it will be apparent to one skilled in the art that the various embodiments can be practiced without these specific details. In other instances, structures and devices are shown in block diagram form in order to avoid obscuring the certain details. For example, an embodiment is described below with reference to user interfaces and particular hardware. However, other embodiments can be described with reference to any type of computing device that can receive data and commands, and any peripheral devices providing services.

Reference in the specification to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Some portions of the following detailed description are presented in terms of algorithms and symbolic representations of operations on data bits within a computer memory. These algorithmic descriptions and representations are the methods used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared or otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following disclosure, it is appreciated that throughout the disclosure terms such as "processing," "computing," "calculating," "determining," "displaying" or the like, refer to the action and processes of a computer system, or similar electronic computing device, that manipulates and transforms data represented as physical (electronic) quantities within the computer system's registers and memories into other data similarly represented as physical quantities within the computer system's memories or registers or other such information storage, transmission or display devices.

The present embodiments also relate to an apparatus for performing the operations herein. This apparatus may be specially constructed for the required purposes, or it may be a general-purpose computer selectively activated or reconfigured by a computer program stored in the computer. The embodiments disclosed may take the form of an entirely hardware embodiment, an entirely software embodiment or an embodiment including both hardware and software elements. One embodiment is implemented in software comprising instructions or data stored on a computer-readable storage medium, which includes but is not limited to firmware, resident software, microcode or another method for storing instructions for execution by a processor.

Furthermore, the embodiments may take the form of a computer program product accessible from a computer-usable or computer-readable storage medium providing program code for use by, or in connection with, a computer or any instruction execution system. For the purposes of this description, a computer-usable or computer readable storage medium is any apparatus that can contain, store or transport the program for use by or in connection with the instruction execution system, apparatus or device. The computer-readable storage medium can be an electronic, magnetic, optical, electromagnetic, infrared, or semiconductor system (or apparatus or device) or a propagation medium. Examples of a tangible computer-readable storage medium include a semiconductor or solid state memory, magnetic tape, a removable computer diskette, a random access memory (RAM), a read-only memory (ROM), a rigid magnetic disk, an optical disk, an EPROM, an EEPROM, a magnetic card or an optical card. Examples of optical disks include compact disk-read only memory (CD-ROM), compact disk-read/write (CD-R/W) and digital video disc (DVD).

Embodiments of the system described herein are suitable for storing and/or executing program code includes at least one processor coupled directly or indirectly to memory elements through a system bus. The memory elements may include local memory employed during actual execution of the program code, bulk storage and cache memories providing temporary storage of at least some program code in order to reduce the number of times code must be retrieved from bulk storage during execution. In some embodiments, input/output (I/O) devices (such as keyboards, displays, pointing devices or other devices configured to receive data or to present data) are coupled to the system either directly or through intervening I/O controllers.

Network adapters may also be coupled to the data processing system to allow coupling to other data processing systems or remote printers or storage devices through intervening private or public networks. Modems, cable modem and Ethernet cards are just examples of the currently available types of network adapters.

Finally, the algorithms and displays presented herein are not inherently related to any particular computer or other apparatus. Various general-purpose systems may be used with programs in accordance with the disclosure herein, or it may prove convenient to construct more specialized apparatus to perform the required method steps. The required structure for a variety of these systems will appear from the description below. It will be appreciated that a variety of programming languages may be used to implement the disclosure of the embodiments as described herein.

System Overview

FIG. 1 shows one embodiment of a system 100 for optimizing content of a web page including a video. In the embodiment depicted by FIG. 1, the system 100 includes a content management system (CMS) 110, a data store 120, an analytics server 123 that includes an analytics engine 125, a cache 130, one or more advertisement servers ("ad servers") 140A-140N (also referred to individually and collectively as 140), a network 150, a third party video server 180, a third party ad server 190, one or more user devices 160A, 160B, 160C (also referred to individually and collectively as 160) and one or more destination sites 170A-170N (also referred to individually and collectively as 170). Additionally, FIG. 1 also illustrates a media player 115 operating on one or more user devices 160. However, in other embodiments, the system 100 may include different and/or additional components other than those depicted by FIG. 1.

The components of the system 100 are communicatively coupled to one another. For example, the analytics server 123 is communicatively coupled to the network 150 via signal line 199. The CMS 110 is communicatively coupled to the cache 130 via signal line 195. The user device 160A is communicatively coupled to the network 150 via signal line 197A. The user device 160B is communicatively coupled to the network 150 via signal line 197B. The user device 160C is communicatively coupled to the network 150 via signal line 197C.

The CMS 110 includes one or more processors and one or more storage devices storing data or instructions for execution by the one or more processors. For example, the CMS 110 is a server, a server array or any other computing device, or group of computing devices, having data processing and communication capabilities. The CMS 110 receives video data and metadata from one or more publishers operating on one or more user devices 160 or other sources. A publisher is a user that publishes a video on one or more of the CMS 110, the third party video server 180 and the destination site 170. For example, a publisher is an owner of a video. The CMS 110 associates the metadata with the video data and communicates the metadata, video data and association between video data and metadata to the data store 120, allowing the data store 120 to maintain relationships between video data and the metadata. Additionally, the CMS 110 receives search queries for stored video data from a user device 160 and retrieves video data and metadata associated with the stored video data from the data store 120.

In one embodiment, the CMS 110 generates data or instructions for generating a media player 115 used to present the video data when executed by a processor. For example, the CMS 110 generates "embed code" that is included in a web page so that a media player 115 is embedded in the web page when loading the web page in a browser. The CMS 110 generates the data for creating a media player 115 (e.g., embed code) based at least in part on the video data and the metadata associated with the video data. In another embodiment, the analytics server 123 generates data or instructions for generating the media player 115. The analytics server 123 is described in further detail below.

In one embodiment, the media player 115 is not generated based at least in part on data or instructions generated by the analytics server 123. For example, the media player 115 includes code and routines stored on the user device 160. A processor of the user device 160 executes the media player 115. A browser (not pictured) stored and executed by the user device 160 receives video data from the CMS 110 via the network 150. The media player 115 receives the video data from the browser and displays a video on a display (not pictured) communicatively coupled to the user device 160. Optionally, the media player 115 includes extensible metadata that can be modified by a user to change the features of the media player 115. The media player 115 is described in more detail below.

Additionally, the CMS 110 includes data or instructions for generating one or more user interfaces displaying video data and metadata retrieved from the data store 120. The user interfaces generated by the CMS 110 simplify user review and modification of metadata associated with the video data, allowing publishers to customize presentation of the video data to other users via a destination site 170 and presentation of content along with the video data. For example, a user interface generated by the CMS 110 allows a publisher to customize the branding or skin of an embedded media player 115 used to present the video data when retrieved from a destination site 170 by modifying the metadata used by the CMS 110 to generate customized configuration data for the media player 115. As another example, a user interface generated by the CMS 110 allows a publisher to customize the temporal location and placement of supplemental content, such as an advertisement ("ad"), within video data when the video data is presented by a media player 115 operating on a user device 160.

In one embodiment, the CMS 110 performs one or more tests to optimize content of a web page. For example, the CMS 110 generates graphical data for providing a user interface to a publisher of a web page, allowing the publisher to configure the web page according to different content configurations, respectively. A content configuration is data describing an arrangement of content within a web page. For example, a web page includes a media player for playback of video content, the video player is positioned at a first position on the web page and the content configuration includes data describing components of a web page (such as the media player) and positions for each component within the web page (such as the media player being at the first position). The content management system 110 configures the web page using different content configurations, respectively, and cooperates with the analytics server 123 to test the performance for one or more of the content configurations so that a configuration having the best web analytics performance as measured by the analytics server 123 is selected. In one embodiment, such selection can involve A/B testing or other methods for determining the best performing configuration. The analytics server 123 optimizes content of the web page by comparing the performances for the different content configurations. The content management system 110 is further described below with reference to FIGS. 3A and 3B.

The data store 120 is a non-volatile memory device or similar persistent storage device and media coupled to the CMS 110 for storing video data and metadata associated with stored video data. For example, the data store 120 and the CMS 110 exchange data with each other via the network 150. Alternatively, the data store 120 and the CMS 110 exchange data via a dedicated communication channel. While the embodiment shown by FIG. 1 depicts the data store 120 and CMS 110 as discrete components, in other embodiments a single component includes the data store 120 and the CMS 110.

In one embodiment, the data store 120 includes one or more tables associating metadata with video data. For example, the data store 120 includes a table where an entry in the table includes a field identifying the video data and additional fields include metadata associated with the video data. Additionally, the data store 120 may include additional tables identifying data used by a destination site 170 when storing video data for access by user devices 160. In one embodiment, the data store 120 includes data mapping metadata associated with video data to data used by a destination site 170. The mapping of metadata associated with video data to data used by a destination site 170 allows the data store 120 to automatically map metadata associated with video data with one or more data fields used by a destination site 170, which beneficially reduces the time for a destination site 170 to store and communicate video data from the data store 120 to a user device 160. In one embodiment, the data store 120 or the CMS 110 includes an index to expedite identification and/or retrieval of stored data from the data store 120.

The analytics server 123 is one or more devices having at least one processor coupled to at least one storage device including instructions for execution by the processor. For example, the analytics server 123 is one or more servers or other computing devices having data processing and data communication capabilities. The analytics server 123 monitors a website by receiving web interaction data from a user device 160 that loads one or more web pages on the website. The web interaction data is any data describing interaction between a web page and a user device 160. For example, the web interaction data indicates that a browser in the user device 160 has loaded a web page for 5 minutes before switching to another web page. In one embodiment, the web interaction data includes one or more of user interaction with a web page (e.g., a user clicking a link connected to a photo), data identifying the web page (e.g., a uniform resource locator ("URL") for the web page) and an indication identifying a content configuration for the web page.

In one embodiment, the analytics server 123 only monitors interaction between a web page and a user device 160 after receiving permission to do such monitory from the human user o the user device 160. For example, the analytics server 123 serves a web page to the user device 160 including a description of a privacy policy that requires the analytics server 123 to anonymize any data describing the activities of the user device 160 so that the identity of the user device 160 and the human user of the user device 160 cannot be determined. The web page can further include an explicit description of how the human user of the user device 160 has the right to opting in or opting out of data collection performed by the analytics server 123. If the human user of the user device 160 provides an input opting out data collection, then the analytics server 123 does not monitor interaction between a web page and the user device 160. In one embodiment, if the analytics server 123 does collect data describing interaction between a web page and the user device 160, then the data is anonymized as described above and stored in compliance with a privacy policy that is shared with the human user of the user device 160.

Additionally, the analytics server 123 receives a request from a media player 115 included in a web page. A request describes one or more of a state of a media player 115 and an action taken by the media player 115. There are different requests corresponding to different states and/or different actions. For example, a paused request indicates that the media player 115 has paused playback of a video. Other requests are described below. In one embodiment, a request includes one or more of an indication identifying a content configuration for the web page and data describing interaction with the video. For example, a video-click request indicates that a user has provided an input to play a video by clicking a play graphic and the web page including the video is configured according to a content configuration identified by the indication that is included in the request.

The analytics server 123 analyzes the web interaction data and the requests to generate video-aware analytics data. Video-aware analytics data is data describing interaction with one or more of a web page and a video embedded in the web page. For example, the video-aware analytics data includes data describing the effect of video content on a web page (e.g., the presence of a video promoting user visits to the web page) and how one or more arrangements of web page content affect user access to video data (assume, for example, that an embedded video placed at the top of a web page is likely to have more video views than the same video placed at the bottom of the web page). In another example, the video-aware analytics data includes data describing one or more of the session time, the number of conversions, conversion rate, page views, unique page views, average time on the web page per page view, bounce rate, engagement rate, exit rate, video views, unique video views, a ratio of video views to page views, video views with a viewing of at least 25% of the video, video views with a viewing of at least 50% of the video, video views with a viewing of at least 75% of the video, video views with a viewing of 100% of the video, monetizable views, times that an advertisement is being clicked and times that an advertisement is being abandoned, etc.

A conversion is an action that has reached a specified goal. In one embodiment, the goal is specified by the administrator of the website. The goal can require multiple steps be taken by the visitor. For example, if a specified goal for a website is to have a visitor click a link to go to a second website and buy a product, a conversion occurs when the visitor has taken the steps to buy the product. A conversion rate is a percentage of sessions that result in occurrence of conversions. A bounce rate is a percentage of visitors that visit a web page on a website and leave the website without viewing any other web pages on the website. For example, a bounce rate represents a percentage of visitors that only view a single web page on a website. An engagement rate is a percentage of visitors that visit a web page on a website and further visit one or more additional web pages on the website. For example, an engagement rate indicates that 60% of visitors to a home page of a website click a hyperlink to visit a next web page from the home page. An exit rate for a web page is a percentage of visitors that visit a website and exit the website from the web page. For example, an exit rate for a web page represents a percentage of visitors that visit one or more web pages on a website (with the one or more web pages including the web page) and leave the website from the web page.

The analytics server 123 optimizes content of a web page based at least in part on the video-aware analytics data. For example, the analytics server 123 generates a first set of video-aware analytics data associated with a first content configuration for a web page and a second set of video-aware analytics data associated with a second content configuration for the same web page. The analytics server 123 compares the first and second sets of video-aware analytics data and selects one of the first content configuration and the second content configuration as an optimized content configuration for the web page. An optimized content configuration is a content configuration that has a better web analytics performance (e.g., higher conversion rate, higher engagement rate, longer session time, more conversions, etc.) than other content configurations. The analytics server 123 optimizes content of the web page by configuring the web page according to the optimized content configuration. The analytics server 123 and the analytics engine 125 are further described below with reference to FIG. 4.

The cache 130 is coupled to the content management system (CMS) 110 using the network 150 or using a direct communication channel between the CMS 110 and the cache 130. When a user device 160 or a destination site 170 retrieves video data from the data store 120, the CMS 110 communicates the video data to the cache 130, which stores a copy of the retrieved video data. Similarly, a request for video data from a user device 160 or a destination site 170 is initially transmitted via the network 150 to the cache 130 and the requested video data is communicated to the user device 160 or the destination site 170 by the cache 130 if a copy of the video data is stored by the cache 130. If the cache 130 does not include a copy of the requested video data, the request is communicated from the cache 130 to the CMS 110 to retrieve the video data. Hence, the cache 130 expedites retrieval of video data. While FIG. 1 illustrates a single cache 130, in other embodiments, the system 100 may include multiple caches 130.

The one or more advertisement servers ("ad servers") 140A-140N are one or more computing devices having a processor and a computer-readable storage medium storing advertisements and data for selecting advertisements. An ad server 140 communicates with the CMS 110 via the network 150 or via a communication channel with the CMS 110. Also, an ad server 140 communicates with destination sites 170, the analytics server 123, third party video servers 190 or user devices 160 via the network 150 to communicate advertisements for presentation when a web page is accessed. An ad server 140 also includes rules for targeting advertisements to specific users, for targeting advertisements to be displayed in conjunction with types of content, for targeting advertisements to specific locations or Internet Protocol (IP) addresses or other rules for selecting and/or targeting advertisements.

An ad server 140 receives metadata associated with video data from the CMS 110 and selects advertisements for presentation in conjunction with the video data based at least in part on the metadata. For example, the ad server 140 selects stored advertisements based at least in part on keywords associated with the video data. Thus, modification of the metadata associated with the video data using the CMS 110 enables modification of the advertisements presented in conjunction with the video data.

The network 150 is a conventional network and may have any number of configurations such as a star configuration, a token ring configuration or another configuration known to those skilled in the art. In various embodiments, the network 150 is a wireless network, a wired network or a combination of a wireless and a wired network. Furthermore, the network 150 may be a local area network (LAN), a wide area network (WAN) (e.g., the Internet) and/or any other interconnected data path across which multiple devices may communicate. In yet another embodiment, the network 150 may be a peer-to-peer network.

The network 150 may also be coupled to, or include, portions of a telecommunications network for communicating data using a variety of different communication protocols. In yet another embodiment, the network 150 includes a Bluetooth communication network and/or a cellular communications network for sending and receiving data. For example, the network 150 transmits and/or receives data using one or more communication protocols such as short messaging service (SMS), multimedia messaging service (MMS), hypertext transfer protocol (HTTP), direct data connection, WAP, email or another suitable communication protocol.

The one or more user devices 160A, 160B, 160C are computing devices having data processing and data communication capabilities. For example, a user device 160 comprises a desktop computer, a laptop computer, a netbook computer, a tablet computer or a smartphone. In one embodiment, different user devices 160A, 160B, 160C comprise different types of computing devices. For example, the user device 160A is a smartphone, the user device 160B is a tablet computer and the user device 160C is a laptop computer.

A user device 160 receives data from a user identifying a video (e.g., a title of the video, a video identification) and transmits the received data to a destination site 170 or to the CMS 110 via the network 150. The user device 160 then receives video data for the video through the network 150, allowing presentation of the video by the user device 160 to the user. For example, the video is presented on the media player 115. Similarly, the user device 160 receives metadata associated with video data from a user and transmits the metadata to the CMS 110 via the network 150 or receives metadata associated with video data from the CMS 110 from the network 150, allowing a user to view and/or modify the metadata using the user device 160.

In one embodiment, the user device 160 receives inputs from a user interacting with a webpage, the browser, the media player 115, etc. The media player 115 detects a user interaction with the media player 115 before, during and after playback of a video. For example, the media player 115 is configured to detect user interaction with the media player 115 a predetermined amount of time before playback of the video (e.g., 5 seconds or any other amount of time), during playback of the video and a predetermined amount of time after playback of the video (e.g., 5 seconds or any other amount of time). In one embodiment, the user device 160 stores the event data describing user interactions with the media player 115 in a buffer or any other non-transitory memory.

A user device 160 transmits data to the CMS 110 via the network 150 and receives data from the CMS 110 and/or the cache 130 via the network 150. For example, a user device 160 communicates video data to the CMS 110 via the network 150 or receives metadata associated with video data and/or user interface data from the CMS 110. Additionally, a user device 160 receives data from a destination site 170 via the network 150.

The user device 160 also transmits data, via the network 150, to the analytics server 123. For example, the user device 160 transmits event data to the analytics server 123 via the network 150. In one embodiment, the user device 160 generates a request including data describing the status of the media player 115. In other embodiments, the request includes data describing a change in the status of the media player 115. Such requests are generated and transmitted to the analytics server 123 by the media player 115. Different types of requests and communications between the user device 160 and the analytics server 123 are described in further detail below with reference to FIGS. 6A-6C.

In one embodiment the user device 160 is a processor-based smart television.

The destination sites 170A-170N are computing devices having data processing and data communication capabilities, such as web servers. A destination site 170 includes data describing one or more web pages and communicates one or more web pages to a user device 160 via the network 150. One or more web pages stored by a destination site 170 include data or instructions for presenting video data by executing a media player 115 on the user device 160. In one embodiment, a destination site 170 retrieves video data and the media player 115 used to present the video data from the CMS 110, allowing the destination site 170 to present video data using the architecture of the CMS 110. Alternatively, a destination site 170 receives video data and configuration data for a media player 115 from the CMS 110 and embeds the video data and the configuration data into web pages to present video data. For example, a destination site 170 receives embed code describing operation of the media player 115 and identifying video data presented by the media player 115 and includes the embed code in a web page.

Thus, a user device 160 receives a web page from a destination site 170 to access content from the destination site 170 and communicates with the destination site 170 to navigate through a web page maintained by the destination site 170. One or more web pages stored by the destination site 170 include video data that is presented to the user by a media player 115.

The third party video server 180 is one or more devices having at least one processor coupled to at least one storage device including instructions for execution by the processor. For example, the third party video server 180 is a conventional server, a server array or any other computing device or group of computing devices, having data processing and communication capabilities. In one embodiment, the third party video server 180 receives video data and metadata from one or more publishers operating on one or more user devices 160 and provides videos described by the video data and metadata to one or more users. For example, the third party video server 180 publishes a video provided by an owner of the video on a web site and presents the video to a user operating on a user device 160 when a request to view the video is received from the user. The third party video server 180 is communicatively coupled to other components of the system 100 via the network 150.

The third party ad server 190 is any computing device having a processor and a computer-readable storage medium storing advertisements and data for selecting advertisements. For example, the third party server 190 selects an advertisement for a video and sends the advertisement to a user device 160 when the video is played by a media player 115 on the user device 160. The third party ad server 190 is communicatively coupled to other components of the system 100 via the network 150. In one embodiment, the third party ad server 190 provides functionalities similar to those provided by the ad server 140.

User Device 160

Figure 2:
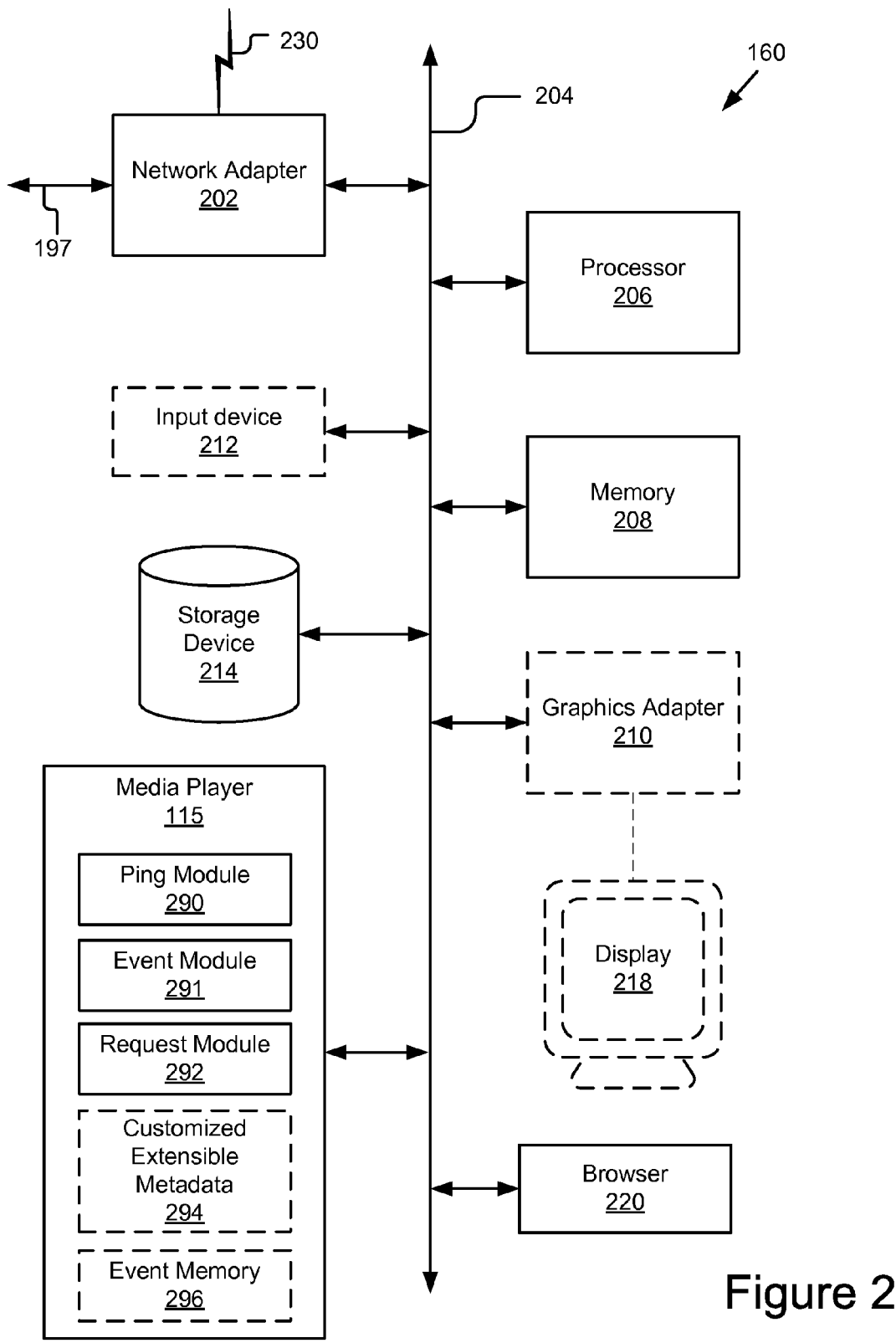
FIG. 2 is a block diagram illustrating one embodiment of a user device.

FIG. 2 is a block diagram illustrating one embodiment of a user device 160. As illustrated in FIG. 2, the user device 160 includes a network adapter 202 coupled to a bus 204. According to one embodiment, also coupled to the bus 204 are at least one processor 206, a memory 208, a graphics adapter 210, an input device 212, a storage device 214, a media player 115 and a browser 220. In one embodiment, the functionality of the bus 204 is provided by an interconnecting chipset. The user device 160 also includes a display 218, which is coupled to the graphics adapter 210. The input device 212, the graphics adapter 210 and the display 218 are depicted using dashed lines to indicate that they are optional features of the user device 160.

The network adapter 202 is an interface that couples the user device 160 to a local or wide area network. For example, the network adapter 202 is a network controller that couples to the network 150 via signal line 197 for data communication between the user device 160 and other components of the system 100. In one embodiment, the network adapter 202 is communicatively coupled to a wireless network (e.g., a wireless local area network) via a wireless channel 230.

The processor 206 may be any general-purpose processor. The processor 206 comprises an arithmetic logic unit, a microprocessor, a general purpose controller or some other processor array to perform computations, provide electronic display signals to display 218. The processor 206 is coupled to the bus 204 for communication with the other components of the user device 160. Processor 206 processes data signals and may comprise various computing architectures including a complex instruction set computer (CISC) architecture, a reduced instruction set computer (RISC) architecture, or an architecture implementing a combination of instruction sets. Although only a single processor is shown in FIG. 2, multiple processors may be included. The user device 160 also includes an operating system executable by the processor such as, but not limited to, WINDOWS®, MacOS X, Android, or UNIX® based operating systems.

The memory 208 holds instructions and data used by the processor 206. The instructions and/or data comprise code for performing any and/or all of the techniques described herein. The memory 208 may be a dynamic random access memory (DRAM) device, a static random access memory (SRAM) device, flash memory or some other memory device known in the art. In one embodiment, the memory 208 also includes a non-volatile memory such as a hard disk drive or flash drive for storing log information on a more permanent basis. The memory 208 is coupled by the bus 204 for communication with the other components of the user device 160. In one embodiment, the media player 115 is stored in the memory 208 and executable by the processor 206.

The storage device 214 is any device capable of holding data, like a hard drive, compact disk read-only memory (CD-ROM), DVD, or a solid-state memory device. The storage device 214 is a non-volatile memory device or similar permanent storage device and media. The storage device 214 stores data and instructions for the processor 206 and comprises one or more devices including a hard disk drive, a floppy disk drive, a CD-ROM device, a DVD-ROM device, a DVD-RAM device, a DVD-RW device, a flash memory device, or some other mass storage device known in the art. For clarity, instructions and/or data stored by the storage device 214 are described herein as different functional "modules," where different modules are different instructions and/or data included in the storage device that cause the described functionality when executed by the processor 206.

The input device 212 may include a mouse, track ball, or other type of pointing device to input data into the user device 160. The input device 212 may also include a keyboard, such as a QWERTY keyboard. The input device 212 may also include a microphone, a web camera or similar audio or video capture device.

The graphics adapter 210 displays images and other information on the display 218. The display 218 is a conventional type such as a liquid crystal display (LCD) or any other similarly equipped display device, screen, or monitor. The display 218 represents any device equipped to display electronic images and data as described herein.

The media player 115 includes code and routines for presenting video data to a user. For example, the media player 115 is a video player executed by a browser 220 to stream video data from one of the CMS 110, the destination site 170 and the third party video server 180 and presents the video data to a user. In one embodiment, the media player 115 is included on one or more web pages provided by one of a destination site 170, a third party video server 180 and the CMS 110. For example, the user device 160 receives a web page from the destination site 170 and generates a media player 115 to present video data to the user according to an embed code in the web page. In another embodiment, the media player 115 includes code and routines stored in a memory of the user device 160 (e.g., one of memory 208 and storage device 214) and executed by the processor 206 to provide the functionality described herein.

In one embodiment, the media player 115 is a video player customized by a publisher such as the third party video server 180 or some other third party. For example, the publisher customizes the customized extensible metadata 204 in the media player 115 so that the media player 115 includes one or more custom features. A custom feature is any feature added to the media player by a third party that is not the human user of the user device 160 or the administrator of the analytics server 123 or the CMS 110. Examples of custom features include an age-gating function, a user login interface, generating a first queue for playback and a second queue for saving a video for playback at a later time. The processor 206 executes the extensible metadata 204 to provide the custom feature. For example, the media player 115 implements an age-gating function by requesting a user to confirm that he/she is at least 18 years old.

In the depicted embodiment, the media player 115 includes, among other things, a ping module 290, an event module 291, a request module 292, a set of customized extensible metadata 294 and an event memory 296. These components of the media player 115 are communicatively coupled to each other. The customized extensible metadata 294 and the event memory 296 are depicted with dashed lines to indicate that they are optional features of the media player 115.

The ping module 290 includes code and routines for handling communication between the media player 115 and other components of the system 100. For example, the ping module 290 transmits a request generated by the request module 291 to the analytics server 123. In one embodiment, the ping module 290 receives video data from one of the CMS 110, the third party video server 180 and the destination site 170. In another embodiment, the ping module 290 receives data for an advertisement from one of the ad server 140, the third party ad server 190 and the analytics server 123.

The event module 291 includes code and routines for generating an event for the media player 115. An event describes a state of the media player 115 triggered by an action taken in the media player 115. For example, when the media player 115 is buffering video data for a video from the content management system 110, a video buffering event is generated by the event module 291. The event module 291 sends event data describing the generated event to the request module 292. In one embodiment, an event describes interaction with a video by a user of the user device 160.

Examples of an event include, but are not limited to, clicking a video to play, viewing 25% of a video, viewing 50% of a video, viewing 75% of a video, viewing 100% of a video, monetizable views, an ad being watched, an ad being clicked, an ad being abandoned, dropping off a video, age-gating, user login, queue for playback, saving for later view and any other events triggered by a publisher's customization of the media player 115.

The request module 292 includes code and routines for generating a request. In one embodiment, the request module 292 generates a request based at least in part on event data received from the event module 291. For example, the request module 292 generates a video-click request if event data describing a user clicking a video to play is received. A request includes one or more of a video identification ("video ID") to identify a video, a video version (e.g., a second version of a video), a location (e.g., an IP address) for a user device 160, a uniform resource locator ("URL") to view a video (or, a URL for a web page including the video), event data describing an event and an indication identifying a content configuration for the web page including the video. The request module 292 sends the generated request to the ping module 290 and the ping module 290 delivers the request to the analytics server 123.

Examples of a request include, but are not limited to, a load request indicating that the media player 115 is loaded on a web page, an ad start request indicating that an ad is starting to play, an ad progress request reporting viewing progress of an ad at a predetermined interval (e.g., 5 seconds), an ad checkpoint request reporting viewing progress of an ad at a checkpoint (e.g., 25%, 50%, 75% and 100% of an ad), an ad end request indicating that an ad is finished playing, a view request indicating that a video is starting to play, a view progress request reporting viewing progress of a video at a predetermined interval (e.g., 10 seconds), a view checkpoint request reporting viewing progress of a video at a checkpoint (e.g., 25%, 50%, 75% and 100% of a video) and a view end request reporting completion of playing a video, etc. Persons of ordinary skill in the art will recognize that the request module 292 may generate other requests.

The customized extensible metadata 294 is extensible metadata used to configure the media player 115. In one embodiment, the customized extensible metadata 294 includes settings for the media player 115 to implement one or more features added by a publisher or any other party. For example, when the media player 115 is loaded by the user device 160, the media player 115 is configured according to the customized extensible metadata 294 so that one or more features customized by the publisher are added to the media player 115. In one embodiment, the customized extensible metadata 294 is stored in the storage device 214 and retrieved by the media player 115 when the media player 115 is loaded. In another embodiment, the media player 115 receives the customized extensible metadata 294 from the player configuration module 338 and stores the customized extensible metadata 294 in the storage device 214. The player configuration module 338 is described below with reference to FIG. 3B.

The event memory 296 stores and buffers the event data transmitted from the event module 292. The event memory 296 may be a dynamic random access memory (DRAM) device, a static random access memory (SRAM) device, flash memory or some other memory device known in the art. In one embodiment, the memory 208 also stores requests generated by the request module 291 in conjunction with the event data.

The browser 220 includes code and routines stored in a memory 208 and executed by a processor 206 of a user device 160. For example, the browser 220 is a browser application such as Google Chrome™. In one embodiment, the browser 220 comprises a memory for storing data (e.g., a cookie or any other data).

In one embodiment, the browser 220 is launched on the user device 160. The browser 220 loads a web page from a website based at least in part on the content configuration for the web page. The content is arranged on the web page based at least in part on the content configuration. For example, the browser 220 receives web page data describing content for a web page and a content configuration for the web page from the CMS 110, arranges content of the web page according to the content configuration and presents the web page to a user of the user device 160. The browser 220 sends any data describing interaction with the web page (e.g., web interaction data) to the analytics server 123. For example, the browser 220 sends web interaction data describing that a user has clicked a hyperlink in the web page to the analytics server 123. In one embodiment, the received web page data includes an embed code for generating a media player 115 so that a media player 115 for playing a video is embedded in the web page when the web page is loaded in the browser 220. In another embodiment, the media player is 115 is a client-side module stored and executed by the user device 160. The browser 220 sends web interaction data for the web page to the analytics server 123, while the media player 115 sends requests that include event data describing interaction with the video to the analytics server 123. For example, the browser 220 sends web interaction data to the analytics server 123 describing that a user has scrolled down the web page to read a brief introduction of a video, while the media player 115 sends a video-click request to the analytics server 123 indicating that the user has clicked to play the video.

Content Management System (CMS) 110

Figure 3A:
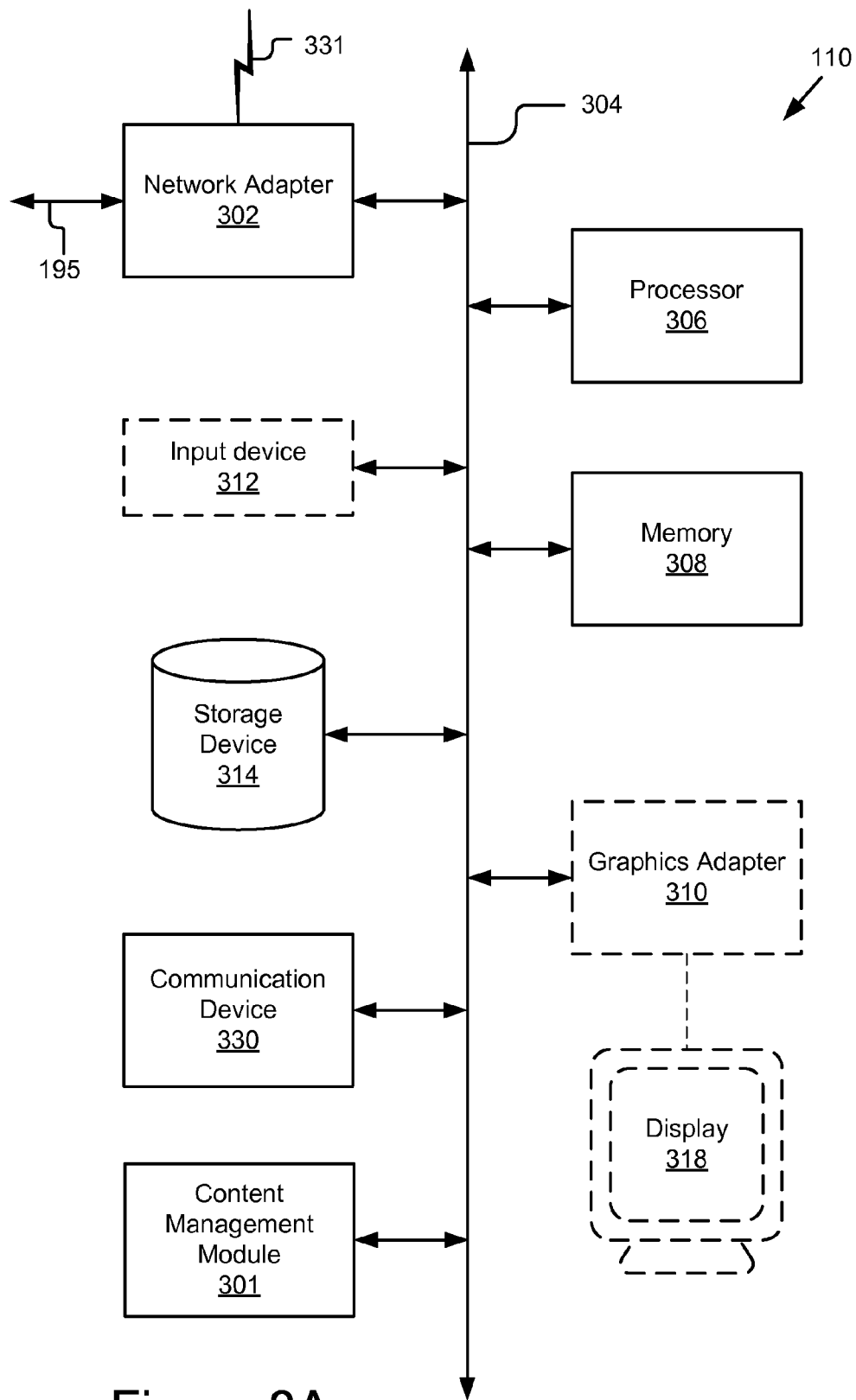
FIG. 3A is a block diagram illustrating one embodiment of a content management system.

FIG. 3A is a block diagram illustrating one embodiment of a CMS 110. As illustrated in FIG. 3A, the CMS 110 includes a network adapter 302 coupled to a bus 304. According to one embodiment, also coupled to the bus 304 are at least one processor 306, a memory 308, a graphics adapter 310, an input device 312, a storage device 314, and a communication device 330. In one embodiment, the functionality of the bus 304 is provided by an interconnecting chipset. The CMS 110 also includes a display 318, which is coupled to the graphics adapter 310. The input device 312, the graphics adapter 310 and the display 318 are depicted using dashed lines to indicate that they are optional features of the CMS 110.

The network adapter 302 is an interface that couples the CMS 110 to a local or wide area network. For example, the network adapter 302 is a network controller that couples to the network 150 via signal line 195 for data communication between the CMS 110 and other components of the system 100. In one embodiment, the network adapter 302 is communicatively coupled to a wireless network (e.g., a wireless local area network) via a wireless channel 331.

The processor 306 is any general-purpose processor. The processor 306 comprises an arithmetic logic unit, a microprocessor, a general purpose controller or some other processor array to perform computations, provide electronic display signals to the display 318. The processor 306 is coupled to the bus 304 for communication with the other components of the CMS 110. The processor 306 processes data signals and may comprise various computing architectures including a complex instruction set computer (CISC) architecture, a reduced instruction set computer (RISC) architecture, or an architecture implementing a combination of instruction sets. Although only a single processor is shown in FIG. 3A, multiple processors may be included. The CMS 110 also includes an operating system executable by the processor 306 such as but not limited to WINDOWS®, MacOS X, Android, or UNIX® based operating systems.

The memory 308 holds instructions and data used by the processor 306. The instructions and/or data comprise code for performing any and/or all of the techniques described herein. The memory 308 may be a dynamic random access memory (DRAM) device, a static random access memory (SRAM) device, flash memory or some other memory device known in the art. In one embodiment, the memory 308 also includes a non-volatile memory such as a hard disk drive or flash drive for storing log information on a more permanent basis. The memory 308 is coupled by the bus 304 for communication with the other components of the CMS 110. In one embodiment, the content management module 301 is stored in memory 308 and executable by the processor 306.

The storage device 314 is any tangible device capable of storing data. The storage device 314 is a non-volatile memory device or similar permanent storage device and media. The storage device 314 stores data and instructions for the processor 306 and comprises one or more devices including a hard disk drive, a floppy disk drive, a CD-ROM device, a DVD-ROM device, a DVD-RAM device, a DVD-RW device, a flash memory device, or some other mass storage device known in the art. In some embodiments, the storage device 314 includes instructions and/or data for maintaining metadata associated with video data, for modifying stored metadata or for retrieving stored video data or stored metadata associated with stored video data. For clarity, instructions and/or data stored by the storage device 314 are described herein as different functional "modules," where different modules are different instructions and/or data included in the storage device that cause the described functionality when executed by the processor 306.

The input device 312 may include a mouse, track ball, or other type of pointing device to input data into the CMS 110. The input device 312 may also include a keyboard, such as a QWERTY keyboard. The input device 312 may also include a microphone, a web camera or similar audio or video capture device. The graphics adapter 310 displays images and other information on the display 318. The display 318 is a conventional type such as a liquid crystal display (LCD) or any other similarly equipped display device, screen, or monitor. The display 318 represents any device equipped to display electronic images and data as described herein.

The communication device 330 transmits data from the CMS 110 to the network 150 and receives data from the network 150. The communication device 330 is coupled to the bus 304. In one embodiment, the communication device 330 also exchanges data with one or more of the analytics server 123, the data store 120, the cache 130, the third party video server 180, the third party ad server 190 and/or one or more ad servers 140 using communication channels other than the network 150. In one embodiment, the communication device 330 includes a port for direct physical connection to the network 150 or to another communication channel. For example, the communication device 330 includes a USB, SD, CAT-5 or similar port for wired communication with the network 150. In another embodiment, the communication device 330 includes a wireless transceiver for exchanging data with the network 150, or with another communication channel, using one or more wireless communication methods, such as IEEE 802.11, IEEE 802.16, BLUETOOTH® or another suitable wireless communication method.

In yet another embodiment, the communication device 330 includes a cellular communications transceiver for sending and receiving data over a cellular communications network such as via short messaging service (SMS), multimedia messaging service (MMS), hypertext transfer protocol (HTTP), direct data connection, WAP, e-mail or another suitable type of electronic communication. In still another embodiment, the communication device 330 includes a wired port and a wireless transceiver. The communication device 330 also provides other conventional connections to the network 150 for distribution of files and/or media objects using standard network protocols such as TCP/IP, HTTP, HTTPS and SMTP as will be understood to those skilled in the art.

FIG. 3A further illustrates a content management module 301 communicating over bus 304 with the other components of the CMS 110. The content management module 301 provides logic and instructions for storing video data from a publisher and providing the video data to other users. In one embodiment, the content management module 301 can be implemented in hardware (e.g., in an FPGA), as illustrated in FIG. 3A. In another embodiment, the content management module 301 can include software routines and instructions that are stored, for example, in the memory 308 and/or storage device 314 and executable by the processor 306 to cause the processer to store video data from a publisher and provide the video data to other users. Details describing the functionality and components of the content management module 301 will be explained in further detail below with reference to FIG. 3B.

As is known in the art, the CMS 110 can have different and/or other components than those shown in FIG. 3A. In addition, the CMS 110 can lack certain illustrated components. In one embodiment, the CMS 110 lacks an input device 312, graphics adapter 310, and/or display 318. Moreover, the storage device 314 can be local and/or remote from the CMS 110 (such as embodied within a storage area network (SAN)).

As is known in the art, the CMS 110 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 314, loaded into the memory 308, and executed by the processor 306.

Embodiments of the entities described herein can include other and/or different modules than the ones described here. In addition, the functionality attributed to the modules can be performed by other or different modules in other embodiments. Moreover, this description occasionally omits the term "module" for purposes of clarity and convenience.

Content Management Module 301

Figure 3B:
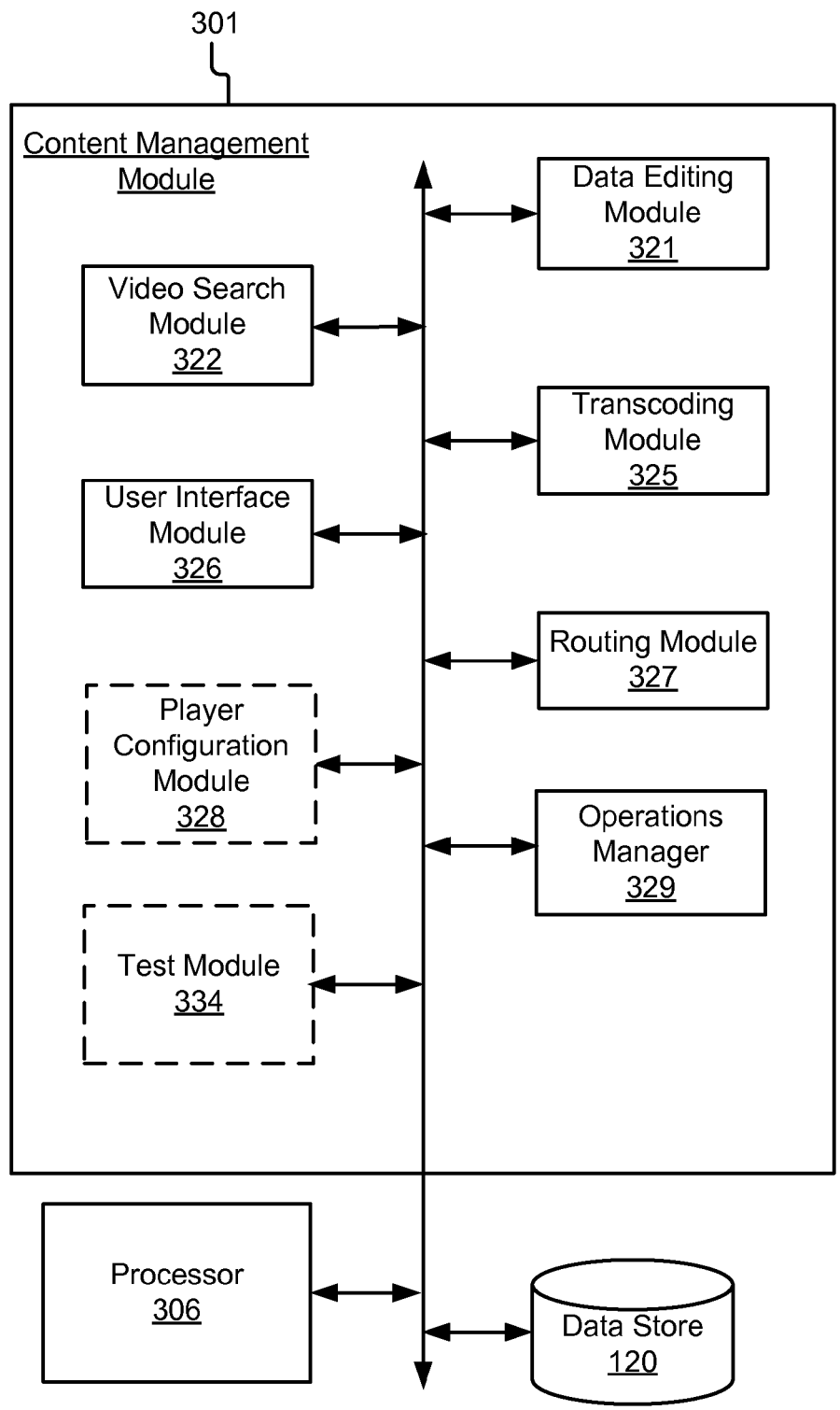
FIG. 3B is a block diagram illustrating one embodiment of a content management module.

Turning now to the content management module 301, FIG. 3B is a block diagram illustrating one embodiment of the content management module 301. In the embodiment depicted by FIG. 3B, the content management module 301 includes a data editing module 321, a video search module 322, a transcoding module 325, a user interface module 326, a routing module 327, a player configuration module 328, an operations manager 329 and a test module 334. In other embodiments, the content management module 301 includes different and/or additional modules than the ones depicted in FIG. 3B.

In one embodiment, the modules are implemented using instructions and/or data included in the storage device 314. In another embodiment, the modules are implemented using one or more hardware devices configured to provide the functionality further described below. For example, the modules are implemented using one or more application specific integrated circuits (ASICs) and/or one or more FPGAs coupled to the bus 304 and configured to provide the functionality of the modules further described below.

The data editing module 321 is software and routines executable by the processor 306 for modifying metadata and/or video data stored in the data store 120. In one embodiment, the data editing module 321 receives data from a user of the user device 160 via the user interface module 326. The data editing module 321 uses the received data to generate (or modify) metadata that is stored by the data store 120. Additionally, the data editing module 321 generates or modifies playlists including a sequence of video data based at least in part on data received from a user device 160 via the user interface module 326. For example, the user interface module 326 receives data for modifying stored metadata associated with video data (or data identifying metadata for association with video data) from a user device 160 via the network 150 and the bus 304. The data editing module 321 modifies the metadata associated with the video data using the received data. In one embodiment, the data editing module 321 stores the received metadata and an association between the received metadata and video data in the data store 120 as described in further detail below.

In one embodiment, the data editing module 321 generates an instruction identifying the metadata to be modified and describing the modification to the metadata. In another embodiment, the data editing module 321 generates an instruction identifying metadata and video data associated with the metadata. The generated instruction is then transmitted to the data store 120 by the communication device 330 to modify the metadata. Similarly, the data editing module 321 generates an instruction modifying a playlist, identifying modifications to the video data included in the playlist or identifying one or more attributes associated with the playlist to be modified. The generated instruction is transmitted to the data store 120 via the bus 304, the communication device 330 and the network 150.

The video search module 322 is software and routines executable by the processor 306 for generating data or instructions for retrieving video data from the data store 120 based at least in part on received input, such as search terms. The video search module 322 searches the data store 120 for metadata that match or are similar to search terms received from the communication device 330 and/or from the user interface module 326. Hence, the video search module 322 allows users to more easily retrieve stored video data using metadata associated with the stored video data. For example, the video search module 322 accesses the data store 120 via the network 150, the communication device 330 and the bus 304 to identify video data associated with metadata that match or are similar to search terms received from the communication device 330 and/or from the user interface module 326.

Rather than require navigation through a directory structure to retrieve stored video data, like conventional data retrieval, the video search module 322 searches metadata associated with stored video data to identify and retrieve stored video data. In one embodiment, the video search module 322 also receives data limiting the metadata to which the search terms are compared. For example, the video search module 322 receives input limiting comparison of search terms to metadata specifying video title and not to other metadata. The video search module 322 also receives data from the data store 120 describing stored video data associated with metadata that match or are similar to the search terms. The video search module 322 communicates the description of the stored video data to the user interface module 326 via the bus 304, and the user interface module 326 generates a user interface presenting the video data from the data store 120 to a user.

The transcoding module 325 is software and routines executable by the processor 306 for generating a copy of the video data encoded in a different format than the video data's original format. The transcoding module 325 includes one or more codecs for generating differently encoded copies of the video data. For example, the transcoding module 325 includes multiple video codecs, such as H.262/MPEG-2 Part 2 codecs, H.264/MPEG-4 Advanced Video Coding codecs, MPEG-4 Part 2 codecs, VP8 codecs or other video codecs. By storing different video codecs, the transcoding module 325 enables generation of a compressed version of stored video data by encoding the video data with one or more of the stored video codecs. The differently-encoded copy of the video data is communicated to the data store 120 for storage and association with the original video data.

In one embodiment, the transcoding module 325 automatically encodes video data received by the CMS 110 using one or more predetermined codecs to generate one or more compressed versions of the video data, which are stored in the data store 120 along with the original video data. For example, the transcoding module 325 automatically encodes video data using one or more commonly-used codecs, such as one or more H.264/MPEG-4 Advanced Video Coding codecs or one or more VP8 codecs. This simplifies distribution of the video data to destination sites 170 by automatically generating compressed versions of the video data using codecs most commonly used by destination sites 170. In one embodiment, input received by the user interface module 326 allows a user to specify one or more codecs that are automatically applied to video data. For example, a user specifies a list of codecs to produce compressed video data compatible with user-desired destination sites 170, allowing the CMS 110 to automatically generate video data compatible with the user-desired destination sites 170.

The transcoding module 325 may also receive input via the user interface module 326, allowing manual identification of a codec and encode video data using the identified codec. Additionally, a user may communicate one or more codecs to the CMS 110 via the network 150 and the transcoding module 325 stores the user-supplied codecs for subsequent use. Additionally, destination sites 170 may communicate codecs to the transcoding module 325 via the network 150, allowing the transcoding module 325 to dynamically modify the codecs used. The transcoding module 325 may also modify the one or more codecs automatically applied to video data responsive to data from destination sites 170 and/or from user devices 160, enabling dynamic modification of video encoding as different and/or additional codecs become more commonly used.

The user interface module 326 is software and routines executable by the processor 306 for generating graphical data to provide one or more user interfaces for receiving data from a user and/or presenting video data and/or metadata associated with video data to a user. For example, the user interface module 326 includes instructions that, when executed by a processor 306, generate graphical data for depicting user interfaces to display metadata associated with video data and/or modify metadata associated with video data. In one embodiment, data stored in the user interface module 326 is communicated to a user device 160 via the communication device 330 and the network 150, and a processor included in the user device 160 generates a user interface by executing the instructions provided by the user interface module 326.

In one embodiment, the user interface module 326 generates graphical data for depicting a user interface to display metadata that is associated with video data and stored in the data store 120 and receive modification to the stored metadata. In another embodiment, the user interface module 326 generates graphical data for depicting a user interface identifying stored video data associated with a user from the data store 120, expediting the user's review of previously stored video data. In yet another embodiment, the user interface module 326 generates graphical data for depicting a user interface that allows a publisher to configure content of a web page such as including a video to the web page and arranging components of the web page in different layouts. The user interface module 326 sends the generated graphical data to the user device 160, causing the user device 160 to generate a user interface using the graphical data. In one embodiment, the user interface module 326 stores the generated graphical data in the storage device 314.

The routing module 327 is software and routines executable by the processor 306 for identifying a destination for data received by the CMS 110 or processed by the CMS 110. After the routing module 327 determines the destination, the communication device 330 transmits the data to the determined destination using the bus 304. In one embodiment, the routing module 327 includes a routing table associating destinations with different types of data and/or with different commands. For example, the routing module 327 determines that editing commands from the data editing module 321 are routed to the data store 120 and determines that search commands from the video search module 322 are routed to the data store 120. As additional examples, the routing module 327 determines that data from the user interface module 326 is directed to a user device 160 or determines that web interaction data or video access data is transmitted to the analytics server 123.

The player configuration module 328 is software and routines executable by the processor 306 for generating settings for a media player 115. In one embodiment, the player configuration module 328 generates the settings for a media player 115 based at least in part on a publisher's customization of the media player 115 via the extensible metadata 294. For example, the player configuration module 328 generates a setting for a media player based at least in part on an age-gating function added by a publisher. The player configuration module 328 is depicted with a dashed line to indicate that in one embodiment the player configuration module 328 is comprised within the content management module 301, while in other embodiments the player configuration module 328 is comprised within one or more of the third party video server 180, the content management module 301 and the destination site 170.

The player configuration module 328 stores the settings for customizing the media player 115. In one embodiment the settings are stored as a portion of the customized extensible metadata 294 in the storage device 314. For example, the player configuration module 328 stores a blacklist as a portion of the customized extensible metadata 294 for identifying domains or geographic regions in which the media player 115 is unable to present video data. In one embodiment, the player configuration module 328 sends the customized extensible metadata 294 to a user device 160 so that the media player 115 launched in the user device 160 is configured according to the customized extensible metadata 294 to implement the features added by the publisher. In another embodiment, the player configuration module 328 stores the customized extensible metadata 294 in the storage device 314 or the data store 120.

The operations manager 329 is software and routines executable by the processor 306 for generating modifications to metadata stored in the data store 120 and scheduling modification of the stored metadata. Additionally, the operations manager 329 determines when data stored by the data store 120 is changed and notifies the CMS 110 when stored data has been changed using the communication device 330 and/or the network 150 or any other connection to the data store 120. In one embodiment, the operations manager 329 maintains one or more queues for scheduling modification of stored metadata or communicating new metadata to the data store 120. The operations manager 329 also communicates changes of stored metadata to one or more destination sites 170 via the communication device 330 and the network 150, allowing a destination site 170 to receive the most current metadata. In one embodiment, the operations manager 329 generates a queue or other schedule specifying the timing of communication of metadata to one or more destination sites 170.

The test module 334 is software and routines executable by the processor 306 for performing one or more tests for one or more content configurations of a web page. For example, the test module 334 instructs the user interface module 326 to generate graphical data for depicting a user interface that allows a publisher to set up a content configuration for a web page. The user interface module 326 sends the graphical data to a user device 160, causing the user device 160 to present the user interface to an administrator of the publisher. The administrator of the publisher inputs a content configuration via the user interface and the content configuration is sent to the test module 334. In one embodiment, the test module 334 assigns an indication (e.g., an identifier) to the content configuration and stores the indication and the content configuration in the storage device 314. The test module 334 configures the web page based at least in part on the content configuration so that the web page is presented to any users in a form corresponding to the content configuration. The test module 334 is configured to communicate with the analytics server 123 so that the analytics server 123 monitors and records any web interaction data from the web page and any requests from the media player 115 embedded in the web page when the web page is loaded on a user device 160. The analytics server 123 generates a set of video-aware analytics data for the web page configured according to the content configuration.

The test module 334 is depicted using a dashed line to indicate that in one embodiment the test module 334 is comprised within the content management module 301, while in other embodiments the test module 334 is comprised within one or more of the third party video server 180, the content management module 301 and the destination site 170.

In one embodiment, the test module 334 performs one or more tests for a web page. In each test, the test module 334 configures the web page according to a two or more content configuration. For example, the test module updates the configuration of objects on the web page based at least in part on the content configuration. The web page is presented to a user via a browser 220 according to one of the two or more content configurations. Different users operating on different user devices 160 are presented with a web page configured based on different content configurations. For example, a first user of a first user device 160B is presented with the web page generated based on a first content configuration and a second user of a second user device 160C is presented with the web page generated based a second content configuration. In other words, the first user sees the web page configured one way, and the second user sees the web page configured a second way different from the first user. The analytics server 123 analyzes the way the first user and the second user interact with their respective web pages in order to determine which configuration results in better web analytics for the web page. The analytics server 123 generates a set of video-aware analytics data for the first content configuration and the second content configuration. The analytics server 123 determines an optimized content configuration based at least in part on a comparison of the video-aware analytics data so that the better performing content configuration is determined to be the optimized content configuration.

Examples of a content configuration include, but are not limited to, a content configuration with presence of a video, a content configuration with absence of the video, a content configuration with the video present in a first location of the web page, a content configuration with the video present in a second location of the web page, a content configuration with a different video present in one of the first and the second locations of the web page, a content configuration with a first thumbnail for the video, a content configuration with a second thumbnail for the video, a content configuration with a pre-roll advertisement for the video (e.g., an ad played a predetermined amount of time before viewing the video), a content configuration with a mid-roll advertisement for the video (e.g., an ad played in the middle of viewing the video) and a content configuration with a post-roll advertisement for the video (e.g., an ad played a predetermined amount of time after viewing the video), etc. In one embodiment, the test module 334 assigns an indication (e.g., an ID number) to each content configuration so that each content configuration for a web page is identified by its indication.

As a first example, the test module 334 receives a first content configuration with data describing the presence of a video in a web page from a publisher. The test module 334 configures the web page according to the first content configuration so that the web page including the video is presented to any users in a form corresponding to the first content configuration. For example, the test module 334 updates the setting of the web page based at least in part on the first content configuration so that when a user requests the web page using a browser 220 executed on a user device 160, the browser 220 configures the web page according to the first content configuration and presents the web page to the user. The analytics server 123 collects web interaction data from the web page loaded on a user device 160 and any requests generated by the media player 115 embedded in the web page. The analytics server 123 generates a first set of video-aware analytics data for the first content configuration. The test module 334 receives a second content configuration with absence of the video so that the video is not included in the web page. The test module 334 configures the web page according to the second content configuration so that the web page without the video is presented to any users in a form corresponding to the second content configuration. The analytics server 123 collects web interaction data from the web page loaded on a user device 160 to generate a second set of video-aware analytics data for the second content configuration. The analytics server 123 optimizes the content of the web page using the first set and the second set of video-aware analytics data. In one embodiment, this optimization includes A/B testing. The optimization of web page content is described below with reference to FIG. 4.

As a second example, the test module 334 receives a first content configuration with data describing a web page having a video present in a first location within the web page. The test module 334 configures the web page according to the first content configuration. The web page with the video present in the first location is presented to any users. The analytics server 123 generates a first set of video-aware analytics data for the first content configuration. Next, the test module 334 receives a second content configuration with the same video present in a second location within the web page and configures the web page according to the second content configuration. The web page with the same video present in the second location is presented to any users. The analytics server 123 generates a second set of video-aware analytics data for the second content configuration. The analytics server 123 optimizes content of the web page using the first set and the second set of video-aware analytics data.

As a third example, the test module 334 receives a first content configuration with data describing a first video present in a first location within a web page. The test module 334 configures the web page according to the first content configuration. The web page including the first video is presented to any users. The analytics server 123 generates a first set of video-aware analytics data for the first content configuration. Next, the test module 334 receives a second content configuration with a second video present in the same location as the first video (i.e., the first location). The test module 334 configures the web page according to the second content configuration and the web page including the second video is presented to any users. The analytics server 123 generates a second set of video-aware analytics data for the second content configuration. The analytics server 123 optimizes content of the web page using the first set and the second set of video-aware analytics data.

As a fourth example, the test module 334 receives a first content configuration with data describing web page having a first thumbnail for a video. The test module 334 configures the web page according to the first content configuration. The web page with the first thumbnail for the video is presented to any users. The analytics server 123 generates a first set of video-aware analytics data for the first content configuration. Next, the test module 334 receives a second content configuration with a second thumbnail for the same video and configures the web page according to the second content configuration. The web page with the second thumbnail for the video is presented to any users. The analytics server 123 generates a second set of video-aware analytics data for the second content configuration. The analytics server 123 optimizes content of the web page using the first set and the second set of video-aware analytics data.

As a fifth example, the test module 334 receives a first content configuration with data describing a web page having a pre-roll advertisement ("ad") for the video. The test module 334 configures the web page according to the first content configuration and the web page with the pre-roll ad for the video is presented to any users. The analytics server 123 generates a first set of video-aware analytics data for the first content configuration. Next, the test module 334 receives a second content configuration with a mid-roll ad for the video and configures the web page according to the second content configuration. The web page with the mid-roll ad for the video is presented to any users. The analytics server 123 generates a second set of video-aware analytics data for the second content configuration. Additionally, the test module 334 receives a third content configuration with a post-roll ad for the video and configures the web page according to the third content configuration. The web page with the post-roll ad for the video is presented to any users. The analytics server 123 generates a third set of video-aware analytics data for the third content configuration. The analytics server 123 optimizes content of the web page using the first set, the second set and the third set of video-aware analytics data.

Analytics Server 123

Figure 4:
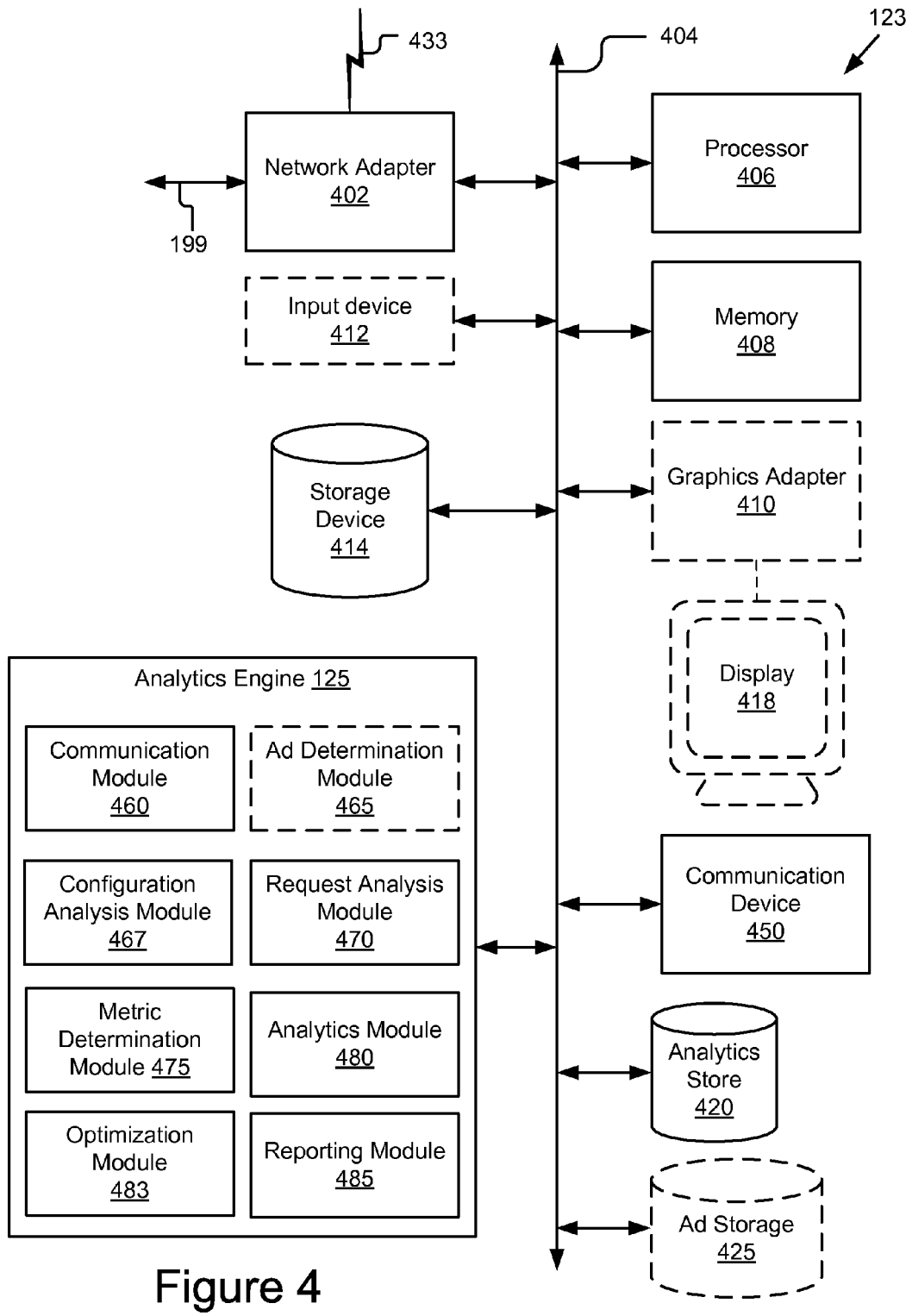
FIG. 4 is a block diagram illustrating one embodiment of an analytics server.

Referring now to FIG. 4, the analytics server 123 and analytics engine 125 are shown in more detail. As illustrated in FIG. 4, the analytics server 123 includes a network adapter 402 coupled to a bus 404. According to one embodiment, also coupled to the bus 404 are at least one processor 406, a memory 408, a graphics adapter 410, an input device 412, a storage device 414, an analytics engine 125, an analytics store 420, an advertisement storage ("ad storage") 425 and a communication device 450. In one embodiment, the functionality of the bus 404 is provided by an interconnecting chipset. The analytics server 123 also includes a display 418, which is coupled to the graphics adapter 410. The input device 412, the graphics adapter 410 and the display 418 are depicted using dashed lines to indicate that they are optional features of the analytics server 123. Persons of ordinary skill in the art will recognize that the analytics server 123 can have different and/or other components than those shown in FIG. 4. In addition, the storage device 414 can be local and/or remote from the analytics server 123 (such as embodied within a storage area network (SAN)).

As is known in the art, the analytics server 123 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device, loaded into the memory, and executed by the processor 406.

Embodiments of the entities described herein can include other and/or different modules than the ones described here. In addition, the functionality attributed to the modules can be performed by other or different modules in other embodiments. Moreover, this description occasionally omits the term "module" for purposes of clarity and convenience.

The network adapter 402 is an interface that couples the analytics server 123 to a local or wide area network. For example, the network adapter 402 is a network controller that couples to the network 150 via signal line 199 for data communication between the analytics server 123 and other components of the system 100. In one embodiment, the network adapter 402 is communicatively coupled to a wireless network (e.g., a wireless local area network) via a wireless channel 433.

The processor 406 is any general-purpose processor. The processor 406 comprises an arithmetic logic unit, a microprocessor, a general purpose controller or some other processor array to perform computations, provide electronic display signals to the display 418. The processor 406 is coupled to the bus 404 for communication with the other components of the analytics server 123. The processor 406 processes data signals and may comprise various computing architectures including a complex instruction set computer (CISC) architecture, a reduced instruction set computer (RISC) architecture, or an architecture implementing a combination of instruction sets. Although only a single processor is shown in FIG. 4, multiple processors may be included. The analytics server 123 also includes an operating system executable by the processor 406 such as but not limited to WINDOWS®, MacOS X, Android, or UNIX® based operating systems.

The memory 408 holds instructions and data used by the processor 406. The instructions and/or data comprise code for performing any and/or all of the techniques described herein. The memory 408 may be a dynamic random access memory (DRAM) device, a static random access memory (SRAM) device, flash memory or some other memory device known in the art. In one embodiment, the memory 408 also includes a non-volatile memory such as a hard disk drive or flash drive for storing log information on a more permanent basis. The memory 408 is coupled by the bus 404 for communication with the other components of the analytics server 123. In one embodiment, the analytics engine 125 is stored in the memory 408 and executable by the processor 346.

The storage device 414 is any device capable of holding data, like a hard drive, compact disk read-only memory (CD-ROM), DVD, or a solid-state memory device. The storage device 414 is a non-volatile memory device or similar permanent storage device and media. The storage device 414 stores data and instructions for the processor 408 and comprises one or more devices including a hard disk drive, a floppy disk drive, a CD-ROM device, a DVD-ROM device, a DVD-RAM device, a DVD-RW device, a flash memory device, or some other mass storage device known in the art. In some embodiments, the storage device 414 includes instructions and/or data for maintaining metadata associated with video data, for modifying stored metadata or for retrieving stored video data or stored metadata associated with stored video data. For clarity, instructions and/or data stored by the storage device 414 are described herein as different functional "modules," where different modules are different instructions and/or data included in the storage device that cause the described functionality when executed by the processor 406.

The input device 412 may include a mouse, track ball, or other type of pointing device to input data into the analytics server 123. The input device 412 may also include a keyboard, such as a QWERTY keyboard. The input device 412 may also include a microphone, a web camera or similar audio or video capture device. The graphics adapter 410 displays images and other information on the display 418. The display 418 is a conventional type such as a liquid crystal display (LCD) or any other similarly equipped display device, screen, or monitor. The display 418 represents any device equipped to display electronic images and data as described herein.

The communication device 450 transmits data from the analytics server 123 to the network 150 and receives data from the network 150. The communication device 450 is coupled to the bus 404. In one embodiment, the communication device 450 also exchanges data with one or more of the CMS 110, the data store 120, the cache 130 and/or one or more ad servers 140 using communication channels other than the network 150. In one embodiment, the communication device 450 includes a port for direct physical connection to the network 150 or to another communication channel. For example, the communication device 450 includes a USB, SD, CAT-5 or similar port for wired communication with the network 150. In another embodiment, the communication device 450 includes a wireless transceiver for exchanging data with the network 150, or with another communication channel, using one or more wireless communication methods, such as IEEE 802.11, IEEE 802.16, BLUETOOTH® or another suitable wireless communication method.

In yet another embodiment, the communication device 450 includes a cellular communications transceiver for sending and receiving data over a cellular communications network such as via short messaging service (SMS), multimedia messaging service (MMS), hypertext transfer protocol (HTTP), direct data connection, WAP, e-mail or another suitable type of electronic communication. In still another embodiment, the communication device 450 includes a wired port and a wireless transceiver. The communication device 450 also provides other conventional connections to the network 150 for distribution of files and/or media objects using standard network protocols such as TCP/IP, HTTP, HTTPS and SMTP as will be understood to those skilled in the art.

The analytics engine 125 includes code and routines when executed by the processor 406 for analyzing web interaction data associated with a web page and any requests received from the media player 115. The analytics engine 125 is communicatively coupled to the bus 404 for communication with other components of the analytics server 123. In one embodiment, the analytics engine 125 provides logic and instructions for generating video-aware analytics data and optimizing content of a web page based at least in part on the video-aware analytics data.

In one embodiment, optimizing content of a web page comprises determining an optimized content configuration based at least in part on a comparison of a first set of video-aware analytics data and a second set of video-aware analytics data. The optimum configuration is a configuration having the best web analytics data. As described below, the analytics engine 125 receives a first set of web interaction data and a second set of web interaction data from a web page loaded on a browser of the user device 160. The analytics engine 125 determines a first content configuration associated with the first set of web interaction data and a second content configuration associated with the second set of web interaction data. The analytics engine 125 receives a first request and a second request from a media player 115. The first request can be from a first media player 115 operating on the first user device 160B and the second request can be from a second media player 115 operating on the second user device 160C. The first request is associated with the first content configuration and the second request is associated with the second content configuration. The analytics engine 125 extracts a first set of event data from the first request and a second set of event data from the second request. The analytics engine 125 generates a first set of video-aware analytics data based at least in part on the first set of web interaction data and the first set of event data. The analytics engine 125 generates a second set of video-aware analytics data based at least in part on the second set of web interaction data and the second set of event data. The analytics engine 125 determines an optimized content configuration based at least in part on a comparison of the first set of video-aware analytics data and the second set of video-aware analytics data. For example, in one embodiment, the first set of video-aware analytics data and the second set of video-aware analytics data are used by the analytics engine 125 for A/B testing to determine which of the first and second configurations results in the best web analytics for the web page.

In one embodiment, the analytics engine 125 is implemented in hardware (e.g., FPGAs, ASICs, etc.). In another embodiment, the analytics engine 125 includes software routines and instructions that are stored, for example, in the memory 408 and/or storage device 414 and executable by the processor 406 to cause the processor 406 to implement functionalities described herein.

In the depicted embodiment as shown in FIG. 4, the analytics engine 125 includes a communication module 460, an advertisement determination module ("ad determination module") 465, a configuration analysis module 467, a request analysis module 470, a metric determination module 475, an analytics module 480, an optimization module 483 and a reporting module 485. These components of the analytics engine 125 are communicatively coupled to each other. The ad determination module 465 is depicted using a dashed line to indicate that it is an optional feature of the analytics engine 125.

The communication module 460 includes code and routines for handling communication between the analytics engine 125 and other components of the analytics server 123. In one embodiment, the communication module 460 receives requests that include event data describing interaction with a video from the media player 115 launched on a user device 160 via the network 150 and the communication device 450. In another embodiment, the communication module 460 receives web interaction data from web pages loaded in a browser that is executed on a user device 160 via the network 150 and the communication device 450. In yet another embodiment, the communication module 460 sends a report generated by the reporting module 485 to a user operating on a user device 160. For example, the reporting module 485 sends the report to an administrator of the web page and the administrator is a user of a computing device such as the user device 160. In yet another embodiment, the communication module 460 sends data stream for an ad to the media player 115 launched on a user device 160.

The ad determination module 465 includes code and routines for determining an ad to be played on the media player 115. For example, the ad determination module 465 parses metadata associated with a video (e.g., a keyword describing the video) and selects an ad from the ad storage 425 based at least in part on the parsed metadata. In one embodiment, an ad associated with a video is pre-determined by a publisher (e.g., an administrator of the third party video server 180) when publishing the video and the ad determination module 465 retrieves the pre-determined ad for the video from the ad storage 425 using the video ID.

In one embodiment, the ad determination module 465 retrieves analytics data for a video from the analytics store 420 and determines an ad for the video based at least in part on the analytics data. For example, if the analytics data shows that 60% of the referrers of the video are geographically located in Asia, the ad determination module 465 selects an ad related to a product that is popular in Asia.

In yet another embodiment, the ad determination module 465 determines when to play the ad during the viewing process of the video. For example, the ad determination module 465 determines whether to play the ad before playing the video (e.g., a pre-roll ad), in the middle of playing the video (e.g., a mid-roll ad) or after playing the video (e.g., a post roll ad).

The configuration analysis module 467 includes code and routines for determining a content configuration for a web page based at least in part on web interaction data associated with the web page and/or requests generated by a media player 115. In one embodiment, the communication module 460 receives web interaction data from a web page loaded on a user device 160 via the communication device 450 and the network 150 and delivers the web interaction data to the configuration analysis module 467. The configuration analysis module 467 extracts an indication identifying a content configuration from the web interaction data and determines a content configuration for the web page based at least in part on the indication. For example, the configuration analysis module 467 obtains an indication identifying a content configuration for the web page from the web interaction data and retrieves the content configuration using the indication from the storage device 314 via the network 150, the communication device 450 and the communication module 460. The configuration analysis module 467 stores the retrieved content configuration and the indication in the configuration data

530 of the analytics store 420. The configuration data 530 is described below with reference to FIG. 5. The configuration analysis module 467 sends the web interaction data to the metric determination module 475. In one embodiment, the configuration analysis module 467 stores the web interaction data in the interaction data 535 of the analytics store 420. The interaction data 535 is described below with reference to FIG. 5.

In another embodiment, the configuration analysis module 467 receives a request from a media player 115 associated with a user device 160. The configuration analysis module 467 extracts an indication identifying a content configuration from the request and determines the content configuration based at least in part on the indication. For example, the configuration analysis module 467 obtains an indication identifying a content configuration from the request and retrieves the content configuration using the indication from the storage device 314 via the network 150 and the communication module 460. The configuration analysis module 467 stores the content configuration and the indication in the configuration data 530 of the analytics store 420. The configuration analysis module 467 sends the request to the request analysis module 470.

In yet another embodiment, the configuration analysis module 467 associates the web interaction data and the requests that are related to the same content configuration for the same web page. For example, the configuration analysis module 467 generates a table listing associations for the web interaction data and the requests that relate to the same content configuration for the same web page and stores the table in the analytics store 420.

The request analysis module 470 includes code and routines for analyzing a request. For example, the request analysis module 470 is a parser parsing a request to extract one or more of a video ID, a video version, a URL to view a video and event data describing an event. In one embodiment, the request analysis module 470 stores the video ID in the video identification data 505, the video version in the video version log 510 and the event data as a portion of event data 520 in the analytics store 420. The video identification data 505, the video version log 510 and the event data 520 are described below with reference to FIG. 5. In one embodiment, the request analysis module 470 also stores the URL in the analytics store 420. The request analysis module 470 sends the event data to the metric determination module 475.

The metric determination module 475 includes code and routines for determining one or more web metrics for web interaction data and/or one or more video metrics for event data. A web metric is a term categorizing the web interaction data. For example, a web metric is a category describing one of page views, unique page views, bounce rate, session time for a website, etc. A video metric is a term categorizing the event data. For example, a video metric is a category describing one of video views, unique video views, video views with a viewing of at least 25% of a video, video views with a viewing of at least 50% of a video, video views with a viewing of at least 75% of a video, video views with a viewing of 100% of a video, monetizable views, an ad being watched, an ad being clicked, an ad being abandoned, dropping off a video, age-gating, user login, generating a queue for playback, saving for later view and any other events triggered by a publisher's customization of the media player 115.

In one embodiment, the metric determination module 475 receives the web interaction data from the configuration analysis module 467 and determines one or more web metrics for the web interaction data. For example, the metric determination module 475 receives web interaction data describing that a new visitor is visiting a web page and determines at least two web metrics for the web interaction data such as "page views" and "unique page views." The metric determination module 475 stores the web metrics in the metric categories 515 of the analytics store 420. The metric categories 515 are described below with reference to FIG. 5. In another embodiment, the metric determination module 475 receives event data from the request analysis module 470 and determines one or more video metrics for the event data. For example, the metric determination module 475 receives event data describing that a user has clicked a mid-roll ad and determines "an ad being clicked" as a video metric for the event data. The metric determination module 475 stores the video metric in the metric categories 515 of the analytics store 420.

Additionally, the metric determination module 475 determines whether the web metric is a new web metric. For example, the metric determination module 475 maintains a list of web metrics and determines a web metric as a new web metric if the web metric is not in the list. The metric determination module 475 adds the new web metric to the list and stores the list in the analytics store 420. Similarly, the metric determination module 475 determines whether the video metric is a new video metric.

The analytics module 480 includes code and routines for analyzing web interaction data and event data to generate video-aware analytics data. For example, the analytics module 480 retrieves the web interaction data associated with a content configuration for a web page and the event data associated with the same content configuration for the same web page. The analytics module 480 generates a set of video-aware analytics data related to the content configuration for the web page using the web interaction data and the event data. In one embodiment, the analytics module 480 generates different sets of video-aware analytics data related to different content configurations for the web page, respectively.

In one embodiment, the analytics module 480 retrieves a content configuration for a web page from the configuration data 530. Next, the analytics module 480 retrieves web interaction data associated with the content configuration from the interaction data 535 and web metrics associated with the web interaction data from the metric categories 515. The analytics module 480 calculates values for the web metrics using the web interaction data. For example, the analytics module 480 calculates values for the web metrics (e.g., page views, unique page views) describing that there are 1,000,000 page views and 980,000 unique page views for the web page configured according to the content configuration in one month. Additionally, the analytics module 480 retrieves event data associated with the content configuration from the event data 520 and video metrics for the event data from the metric categories 515. The analytics module 480 calculates values for the video metrics using the event data. For example, the analytics module 480 calculates values for the video metrics (e.g., video views, unique video views) describing that there are 800,000 video views and 780,000 unique video views for a video embedded in the web page configured according to the content configuration in one month.

The analytics module 480 generates video-aware analytics data based at least in part on the values for the web metrics and the values for the video metrics. For example, the analytics module 480 generates video-aware analytics data by combining the values for the web metrics and the values for the video metrics so that the video-aware analytics data describes that there are 1,000,000 page views, 980,000 unique page views, 800,000 video views and 780,000 unique video views for the web page configured according to the content configuration in one month. In one embodiment, the video-aware analytics data includes the values for the web metrics, the values for the video metrics and other analytics data generated by the analytics module 480. For example, the video-aware analytics data further includes a 10% bounce rate for the 1,000,000 page views and a 15% conversion rate for the web page, etc. The analytics module 480 stores the video-aware analytics data, the values for the web metrics and the values for the video metrics in the analytics data 525 of the analytics store 420. The analytics data 525 is described below with reference to FIG. 5. In one embodiment, the analytics module 480 sends the video-aware analytics data to the optimization module 483 and the reporting module 485, respectively.

In one embodiment, the analytics module 480 analyzes the web interaction data and/or the event data to extract geographic data associated with the web interaction data and/or the event data. For example, the analytics module 480 analyzes the web interaction data received from a user device 160 and determines an IP address for the user device 160. The analytics module 480 stores the geographic data in the analytics store 420.

The optimization module 483 includes code and routines for optimizing content of a web page. For example, the optimization module 483 optimizes content of a web page based at least in part on two sets of video-aware analytics data related to two different content configurations of the web page. The optimization module 483 receives the two sets of video-aware analytics data from the analytics data 525, respectively. The optimization module 483 compares the two sets of video-aware analytics data to generate a comparison result and selects one of the two content configurations as an optimized content configuration for the web page based at least in part on the comparison result. For example, the optimization module 483 compares two sets of video-aware analytics data and generates a result describing that the first content configuration has more conversions and a higher conversion rate than the second content configuration. The optimization module 483 therefore selects the first content configuration as the optimized content configuration for the web page.

In another embodiment, the optimization module 483 generates an optimized content configuration for a web page based at least in part on three or more sets of video-aware analytics data. For example, the optimization module 483 compares three sets of video-aware analytics data associated with three different content configurations for the web page and selects the content configuration with the most conversions as the optimized content configuration.

The optimization module 483 stores the optimized content configuration in the configuration data 530. In one embodiment, the optimization module 483 sends the optimized content configuration to the CMS 110 so that the CMS system 110 configures the web page according to the optimized content configuration.

The reporting module 485 includes code and routines for generating a report to a user. For example, the reporting module 485 retrieves video-aware analytics data from the analytics data 525 and generates a report including the video-aware analytics data. In one embodiment, the reporting module 485 includes data describing one or more predefined reports to expedite generation of the predefined reports. A predefine report is a report with content predefined by an administrator. For example, a predefined report is a video viewing report with predefined contents such as total video views and unique video views for a video. The reporting module 485 receives a selection of a predefined report from a user, retrieves analytics data (e.g., values for web metrics, values for video metrics, video-aware analytics data, etc.) from the analytic store 420 and generates the selected predefined report.

Alternatively, the reporting module 485 instructs a user interface module (not pictured) to generate graphical data for providing a user interface to a user (e.g., a publisher of a web page), allowing the user to specify parameters for generating a customized report. A customized report is a report customized by a user. For example, a customized report is a report describing video-aware analytics data within geographic locations specified by a user.

In one embodiment, the parameters for generating a report are web metrics and/or video metrics. For example, the parameters for generating a report are metrics such as conversion rate, page views, unique page views, bounce rate and video views. The reporting module 485 retrieves video-aware analytics data associated with the parameters from the analytics data 525. The reporting module 485 constructs one or more of charts, diagrams and tables using the retrieved video-aware analytics data. For example, the reporting module 485 generates a table including fields such as page views, unique page views, bounce rate, video views and unique video views. The reporting module 485 generates a report including the video-aware analytics data by incorporating the charts, diagrams and tables into the report.

In one embodiment, the reporting module 485 retrieves geographic data associated with a content configuration from the analytics store 420 and generates a map describing the distribution of the video-aware analytics data according to different geographic locations. The reporting module 485 incorporates the map into the report.

The analytics store 420 is a persistent storage device that stores data received from one or more of a user device 160, a media player 115, the analytics engine 125 and the communication device 450. For example, the analytics store 420 stores one or more of video IDs, video versions, video metrics, event data, location data with video URLs, geographic data for web interaction data and/or event data, web interaction data and other analytics data generated by the analytics module 480 such as video-aware analytics data.

In one embodiment, the analytics store 420 stores web interaction data and requests (or, event data) using a visit identifier, so that interactions with web pages and video data during a visit are maintained according to the visit identifier. The analytics store 420 is further described below with reference to FIG. 5.

The advertisement storage ("ad storage") 425 is a persistent storage device that stores data for playback of an ad. For example, the ad storage 425 stores one or more ads to be displayed before, during or after playback of a video. In one embodiment, the ad storage 425 stores metadata for an ad (e.g., a title, a keyword and a description for the ad), allowing the ad determination module 465 to determine an ad for a video by matching the metadata of the ad against the metadata of the video. For example, the ad determination module 465 compares a keyword describing the video with keywords for the ads stored in the ad storage 425 and selects an ad with the same keyword as the video. In another embodiment, the ad storage 425 stores rules for displaying advertisements as pre-roll ads (e.g., ads played before playing a video), mid-roll ads (e.g., ads played in the middle of playing a video) and past-roll ads (e.g., ads played after playing a video).

Analytics Store 420

Figure 5:
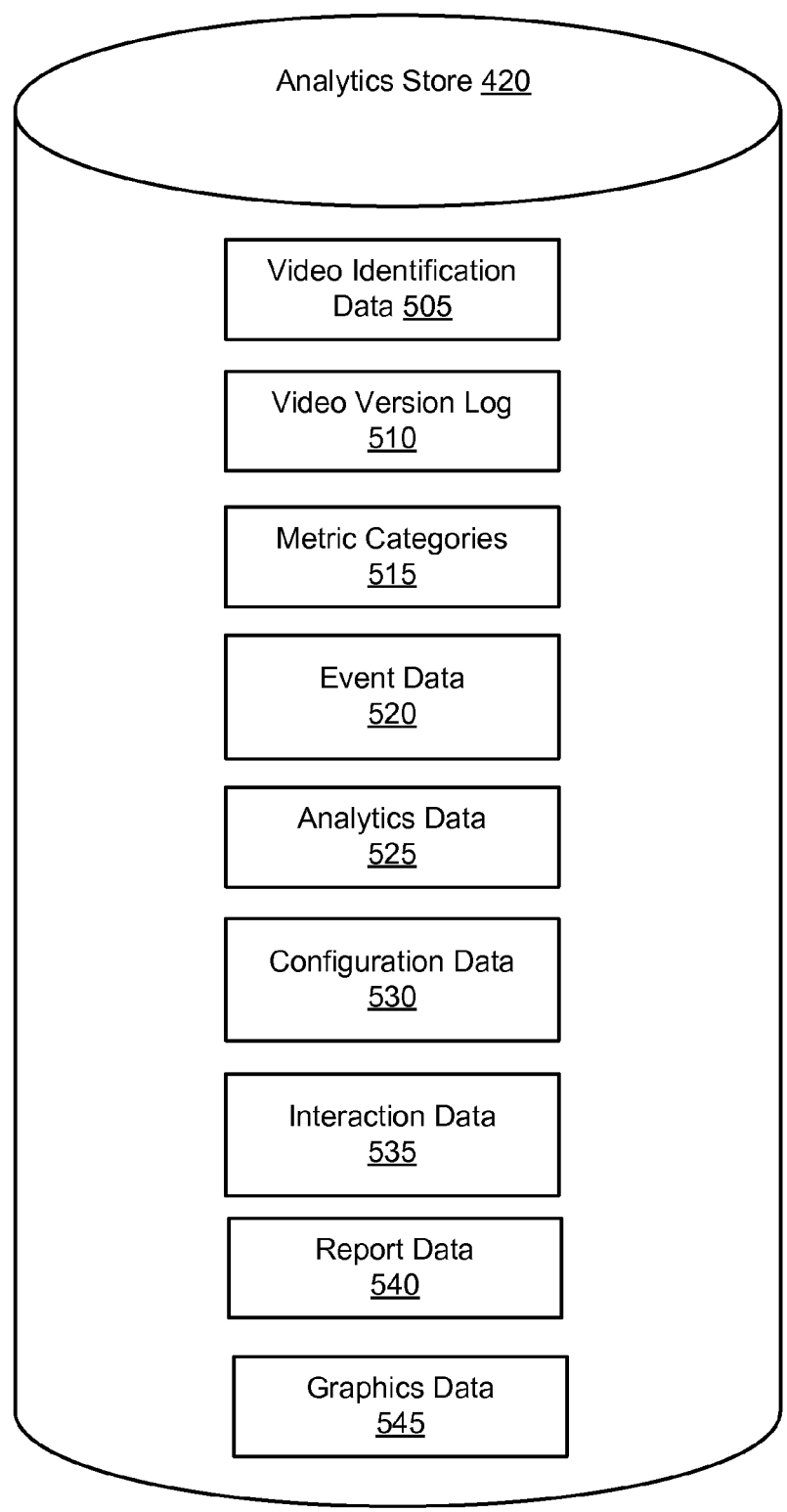
FIG. 5 is a block diagram illustrating one embodiment of an analytics store.

FIG. 5 is a block diagram illustrating one embodiment of the analytics store 420. In the depicted embodiment, the analytics store 420 includes video identification data 505, a video version log 510, metric categories 515, event data 520, analytics data 525, configuration data 530, interaction data 535, report data 540 and graphics data 545. Persons of ordinary skill in the art will recognize that the analytics store 420 may store additional data not depicted in FIG. 5, such as location data for a video, domain restriction data for a media player 115 and other data to provide functionalities described herein.

The video identification data 505 is data identifying one or more videos. In one embodiment, the video identification data 505 includes one or more of a unique video ID that distinguishes a video from another video, a publisher, a published time and a title for a video, etc.

The video version log 510 is a log of data describing various video versions for a video. For example, the video version log 510 stores a video version (e.g., a second version of a video) included in a request and an association between the video version and event data included the same request. In one embodiment, the video version log 510 includes all the video versions for a video and an association between each video version and the event data related to the video version.

The metric categories 515 are data describing web metrics for web interaction data and/or video metrics for event data. For example, the metric categories 515 stores a first list of web metrics for web interaction data and a second list of video metrics for event data received from media players 115. In one embodiment, the metric categories 515 stores web metrics and/or video metrics in one of a list, a table, a queue and/or other data structures.

The event data 520 is data describing events. In one embodiment, the event data 520 describes events occurring in the media player 115 embedded in a web page loading on a user device 160. In another embodiment, the event data 520 includes data describing user interactions with the video included in the web page. For example, the event data 520 includes data describing that a user is marking the video as a favorite video.

The analytics data 525 is data received from the analytics engine 125. For example, the analytics data 525 includes one or more of video-aware analytics data, geographic data associated with page views and/or video views, values for web metrics, values for video metrics and other analytics results generated by the analytics engine 125. The analytics data 525 provides a basis for generating a report to a user. For example, the reporting module 485 retrieves a portion of the analytics data 525 from the analytics store 420 based at least in part on parameters for a report and generates the report using the portion of analytics data 525.

The configuration data 530 includes data describing content configurations for one or more web pages. For example, the configuration data 530 includes all the content configurations for a web page and the corresponding indication for each content configuration.

The interaction data 535 is data describing interaction with one or more web pages. For example, the interaction data 535 includes web interaction data associated with one or more web pages. In one embodiment, the web interaction data for each web page is stored in a section of the analytics store 420 specified for the web page.

The report data 540 is data describing reports generated by the reporting module 485. The reports include at least two types of reports, i.e., predefined reports and customized reports. In each type, the reports can be sharing reports, discovery reports, comparison reports, daily reports, year-end reports, etc. In one embodiment, the report data 540 also include data describing predefined reports. In another embodiment, the report data 540 include report templates for all styles. In yet another embodiment, the report data 540 are saved for a predetermined period of time. For example, the reporting module 485 uses historical reports to generate new reports, such as year-end reports and comparison reports for a set of different time periods.

The graphics data 545 are graphical data used by the reporting module 485 to perform its function. For example, the graphics data 545 includes graphical data used by the reporting module 485 to generate reports, charts, maps, pictures and any other graphics necessary for the reporting module 485 to perform its function.

Event Diagrams

Figure 6A:
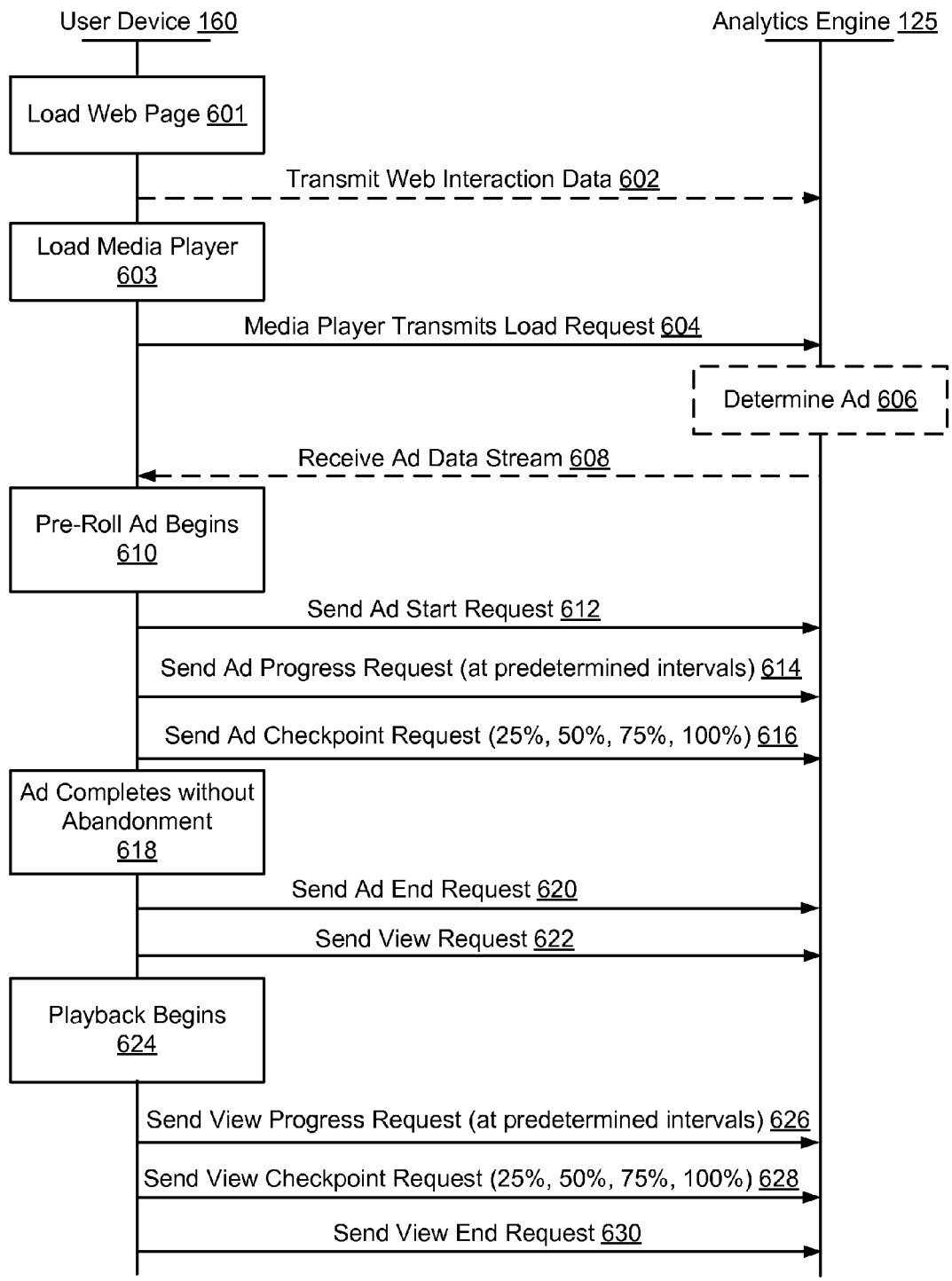
FIGS. 6A-6C are event diagrams illustrating various embodiments of a method for capturing web interaction data and requests.
Figure 6B:
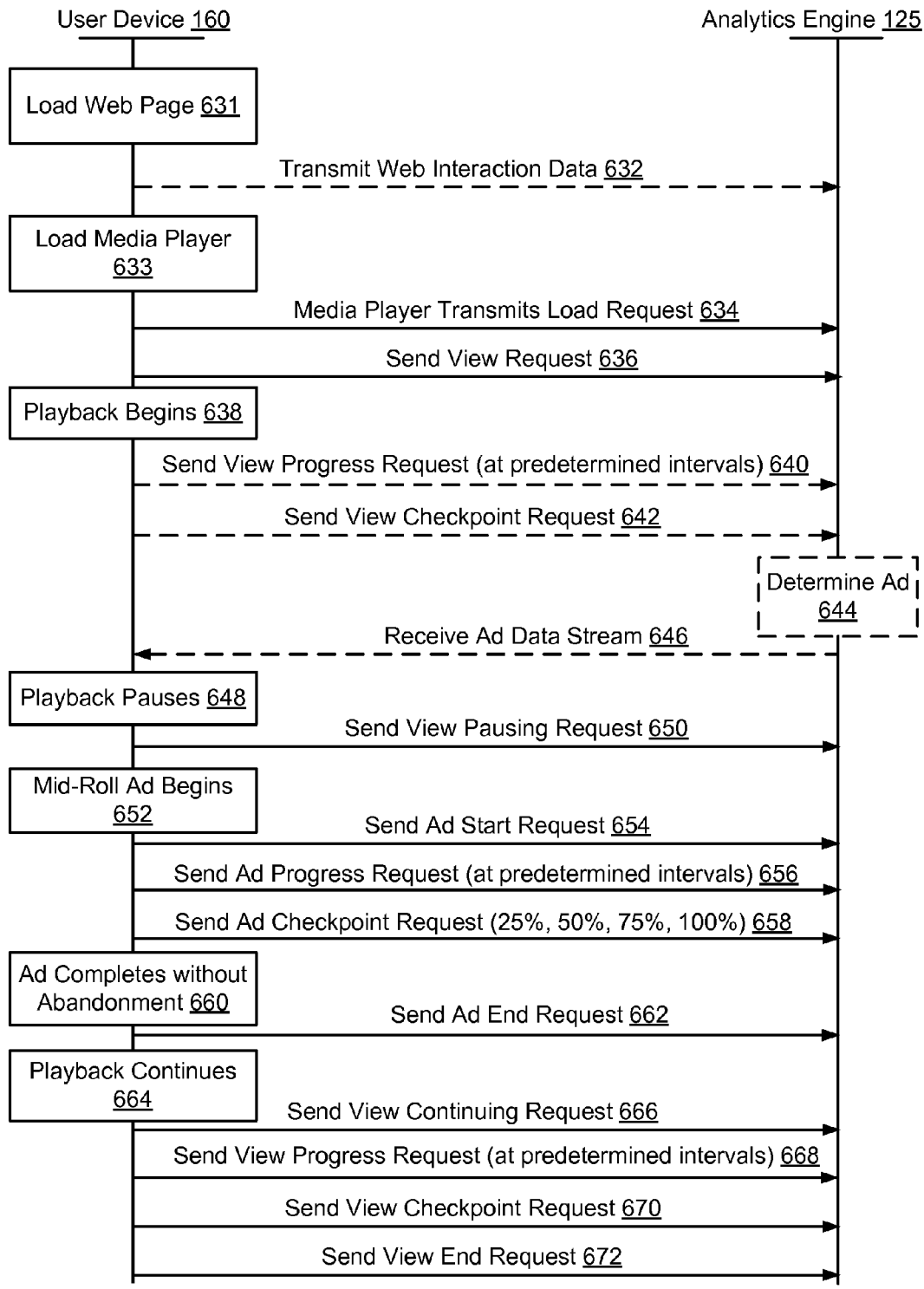
Figure 6C:
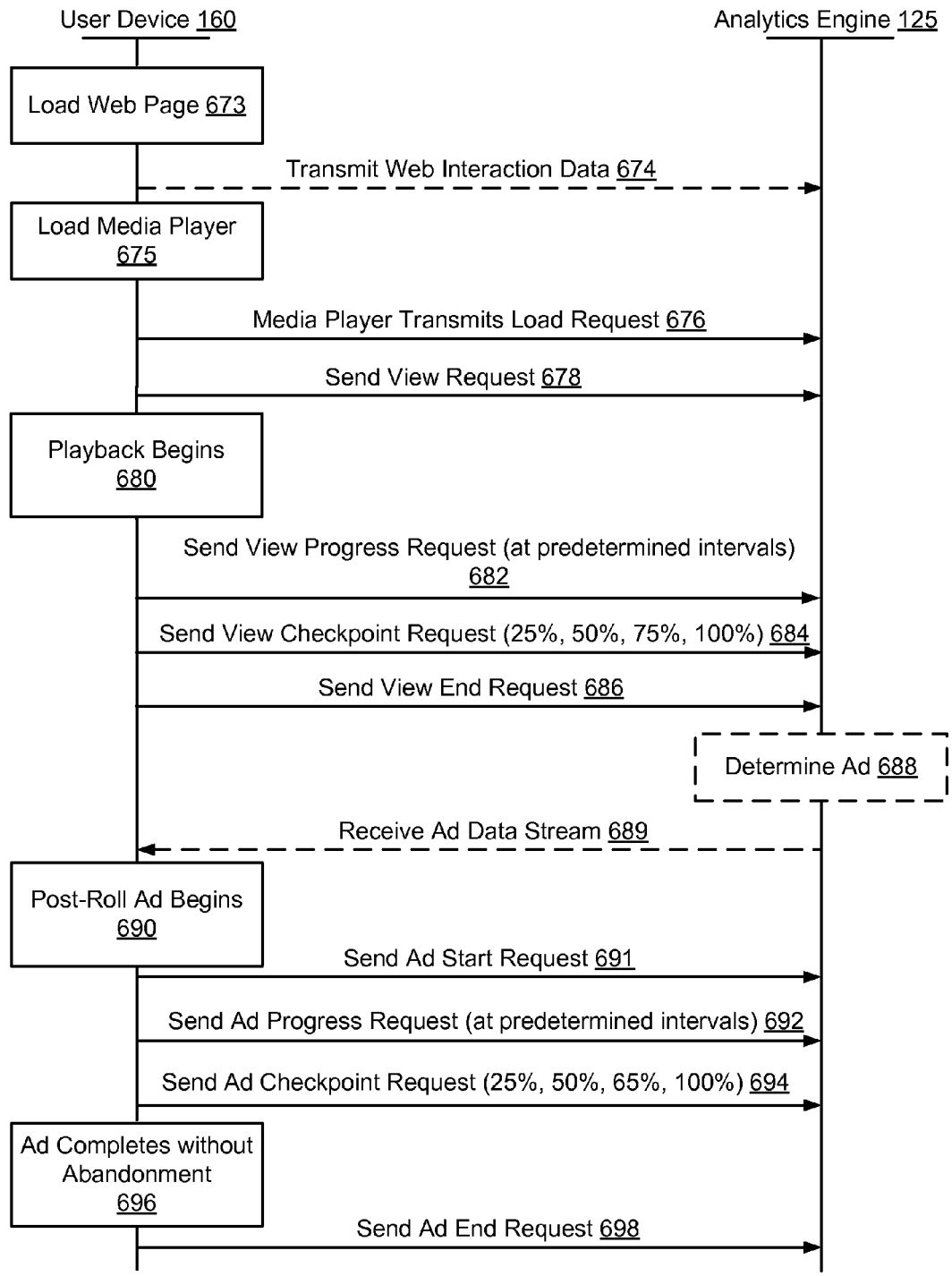
Figure 7:
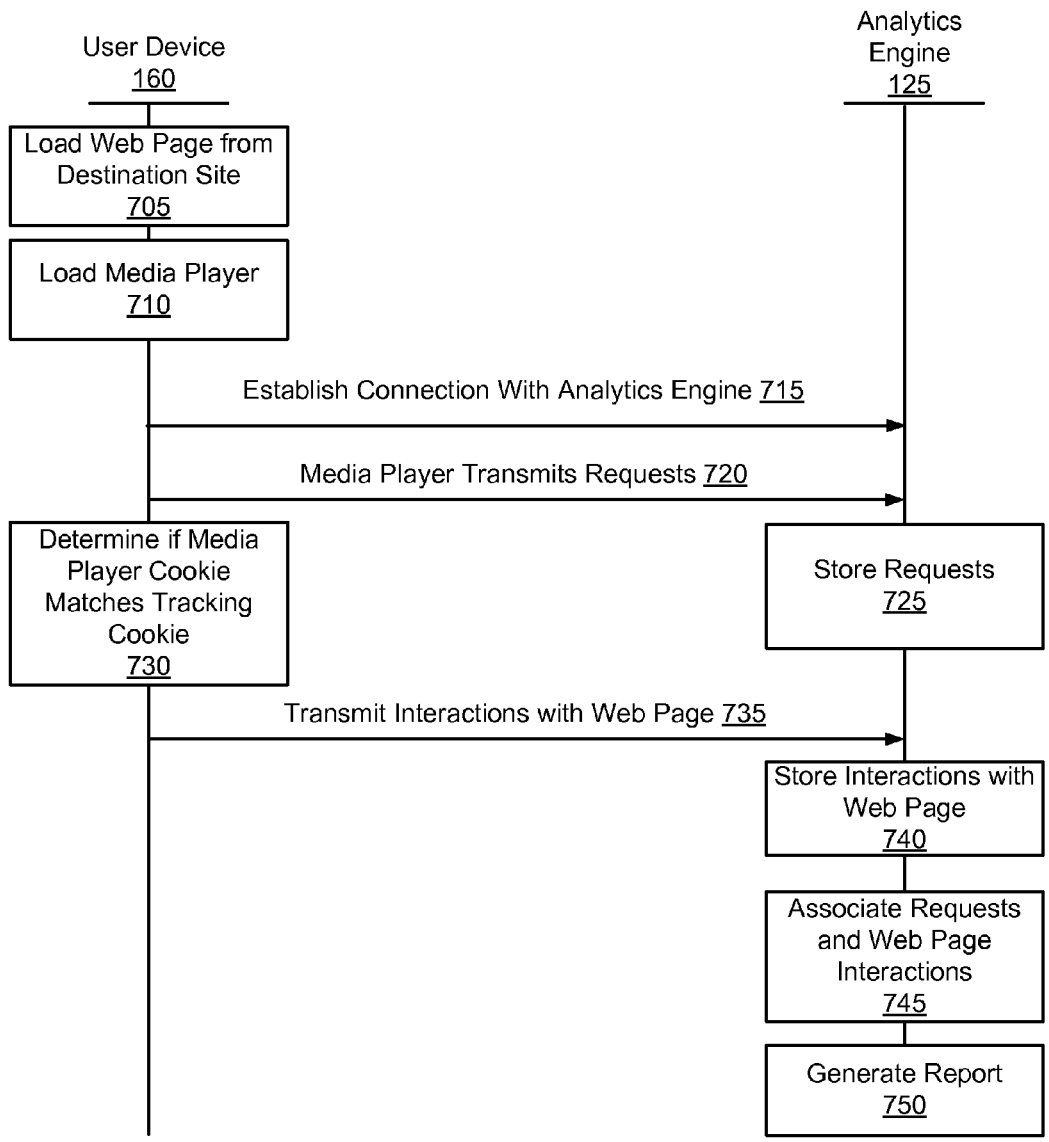
FIG. 7 is an event diagram illustrating one embodiment of a method for capturing and associating web interaction data from a web page and requests from a media player.

Referring now to FIGS. 6-7, various event diagrams of the specification will be described according to one or more embodiments. FIG. 6A illustrates an event diagram of a method for capturing web interaction data and requests according to one embodiment. In the example shown by FIG. 6A, the user device 160 loads 601 a web page that is configured according to a content configuration. The user device 160 establishes a connection to the analytics engine 125 and, optionally, sends 602 web interaction data to the analytics engine 125 if any interaction with the web page is detected. For example, if a user has clicked a hyperlink in the web page, a browser 220 executed in the user device 160 sends web interaction data describing the user clicking the hyperlink to the analytics engine 125. In one embodiment, the user device 160 sends web interaction data to the analytics engine 125 whenever interaction with the web page is detected (e.g., before playing a video, during playing a video, after playing a video, etc.).

If the web page includes a video, the user device 160 loads 603 a media player 115 for presenting the video to a user. When loading on the user device 160, the media player 115 transmits 604 a load request to the analytics engine 125. The load request is generated by the media player 115 responsive to a load event indicating that the media player 115 is loading on the user device 160.

The analytics engine 125 receives the load request from the user device 160. The analytics engine 125 determines 606 an ad to be played and sends the ad to the media player 115. For example, the ad determination module 465 comprised within the analytics engine 125 determines an ad for the video by retrieving an ad stored in the ad storage 425 that matches a keyword of the video. The media player 115 receives 608 the data stream for the ad from the analytics engine 125. Steps 606 and 608 are depicted using dashed lines to indicate that they are optional features. In one embodiment, the media player 115 receives the data stream for an ad from one of the third party ad server 190 and the ad server 140.

The ad begins 610 playing in the media player 115. Since the ad is played before viewing the video, the ad is a pre-roll ad. The media player 115 sends 612 an ad start request to the analytics engine 125. The ad start request includes event data describing that the pre-roll ad has started playback. In one embodiment, the ad start request includes event data describing any other events that have occurred since the last request was sent.

While playing the pre-roll ad, the media player 115 sends 614 an ad progress request to the analytics engine 125 at predetermined intervals defined by an administrator (e.g., every two seconds). The ad progress request includes event data describing how much of the ad has been played back on the media player 115 and any other events that have occurred since the last request was sent to the analytics engine 125. The media player 115 sends 616 one or more ad checkpoint requests to the analytics engine 125 at one or more checkpoints such as playback of 25%, 50%, 75% and 100% of the total length of the ad. The ad checkpoint request includes event data describing the percentage of the ad that has been played back on the media player 115 and any other events that occurred since the last request was sent to the analytics engine 125. If the ad completes 618 playing without abandonment, the media player 115 sends 620 an ad end request to the analytics engine 125 to indicate completion of playing the ad. The ad end request includes event data describing that the entire ad was played back on the media player 115 and any other events that occurred since the last request was sent to the analytics server 125.

After the completion of playing the ad, the media player 115 sends 622 a view request to the analytics engine 125 to indicate video playback has begun. The view request includes event data describing that the video has begun playback and any other events that occurred since the last request was sent to the analytics server 125.

The playback of the video begins 624. The media player 115 sends 626 a video progress request to the analytics engine 125 at predetermined intervals. The video progress request includes event data describing how much of the video has been played back and any other events that occurred since the last request was sent to the analytics server 125. Additionally, the media player 115 also sends 628 one or more view checkpoint requests to the analytics engine 125 at one or more checkpoints such as playback of 25%, 50%, 75% and 100% of the total length of the video. The view checkpoint request includes event data describing the percentage of the video that has been played back on the media player 115 and any other events that occurred since the last request was sent to the analytics engine 125.

When the video completes playing, the media player 115 sends 630 a view end request to the analytics engine 125 to indicate completion of playing the video. The view end request includes event data describing that playback of the video has ended and describing any other events that occurred since the last request was sent to the analytics engine 125.

The descriptions for the different requests described above for FIG. 6A are the same for FIGS. 6B and 6C, so these descriptions will not be repeated when describing FIGS. 6B and 6C.

FIG. 6B illustrates an event diagram of a method for capturing web interaction data and requests according to another embodiment. In the example shown by FIG. 6B, the user device 160 loads 631 a web page that is configured according to a content configuration. The user device 160 establishes a connection to the analytics engine 125 and, optionally, sends 632 web interaction data to the analytics engine 125 if any interaction with the web page is detected. In one embodiment, the user device 160 sends web interaction data to the analytics engine 125 whenever interaction with the web page is detected (e.g., before playing a video, during playing a video or after playing a video, etc.).

If the web page includes a video, the user device 160 loads 633 a media player 115 for presenting the video to a user. When loading on the user device 160, the media player 115 transmits 634 a load request to the analytics engine 125. The media player 115 sends 636 a view request to the analytics engine 125. The playback of the video begins 638. The media player 115 sends 640 one or more view progress requests to the analytics engine 125 at one or more predetermined intervals. The media player 115 sends 642 one or more view checkpoint requests to the analytics engine 125.

The analytics engine 125 determines 644 an ad to be played for the video. The media player 115 receives 646 data stream for playing the ad from the analytics engine 125. Steps 640-646 are depicted using dashed lines to indicate that they are optional features to the method. In one embodiment, the media player 115 receives data stream for an ad from one of the third party ad server 190 and the ad server 140.

Responsive to receiving the data stream for the ad, playback of the video in the media player 115 pauses 648. The media player 115 sends 650 a view pausing request to the analytics engine 125 to indicate that the video is paused in the media player 115. The view pausing request includes event data describing the pausing of video playback and event data describing any other events that have occurred since the last request was sent to the analytics engine 125. The media player 115 buffers the data stream for the ad and the ad begins 652 to play. Since the ad is played in the middle of playing the video, the ad is referred to as a mid-roll ad. The media player 115 sends 654 an ad start request to the analytics engine 125. The media player 115 also sends 656 an ad progress request to the analytics engine 125 at predetermined intervals. The media player 115 sends 658 one or more ad checkpoint requests to the analytics engine 125. The media player 115 sends 662 an ad end request to the analytics engine 125 to indicate completion of playing the ad 660.

When the ad completes playing, the playback of the video continues 664 and the media player 115 sends 666 a view continuing request to the analytics engine 125 to indicate continuing to play the video. The view continuing request includes event data describing that playback of the video has resumed. The view continuing request also includes event data describing any other events that have occurred since the last request was sent. For example, the event data describes how the user interacted with the ad, such as muting the volume during playback of the ad, minimizing the screen of the advertisement during playback of the ad, clicking links and taking steps to purchase a product featured in the ad, etc.

The media player 115 sends 668 a view progress request to the analytics engine 125. The media player 115 sends 670 one or more view checkpoint requests to the analytics engine 125 at one or more checkpoints. The media player 115 sends 672 a view end request to the analytics engine 125.

FIG. 6C illustrates an event diagram of a method for capturing web interaction data and requests according to yet another embodiment. In the example shown by FIG. 6C, the user device 160 loads 673 a web page that is configured according to a content configuration. The user device 160 establishes a connection to the analytics engine 125 and, optionally, sends 674 web interaction data to the analytics engine 125 if any interaction with the web page is detected. In one embodiment, the user device 160 sends web interaction data to the analytics engine 125 whenever interaction with the web page is detected (e.g., before playing a video, during playing a video or after playing a video, etc.).

If the web page includes a video, the user device 160 loads 675 a media player 115 for presenting the video to a user. The media player 115 transmits 676 a load request to the analytics engine 125. The media player 115 sends 678 a view request to the analytics engine 125. The playback of the video begins 680. The media player 115 sends 682 a view progress request to the analytics engine 125 at predetermined intervals. The media player 115 sends 684 one or more view checkpoint requests to the analytics engine 125. The media player 115 sends 686 a view end request to the analytics engine 125 to indicate completion of playing the video.

Responsive to receiving the view end request, the analytics engine 125 determines 688 an ad to be played. The media player 115 receives 689 the ad data stream from the analytics engine 125. Steps 688 and 689 are depicted using dashed lines to indicate that they are optional features of the method. In one embodiment, the media player 115 receives data stream for an ad from one of the third party ad server 190 and the ad server 140.

The media player 115 buffers the data stream for the ad. The ad begins 690 to play. Since the ad is played after viewing the video, the ad is referred to as a post-roll ad. The media player 115 sends 691 an ad start request to the analytics engine 125. The media player 115 sends 692 an ad progress request to the analytics engine 125 at predetermined intervals. The media player 115 sends 694 one or more ad checkpoint requests to the analytics engine 125. If the ad completes 696 playing without abandonment, the media player 115 sends 698 an ad end request to the analytics engine 125.

FIG. 7 illustrates an event diagram of a method for capturing and associating web interaction data and video interaction data (e.g., requests from a media player 115) according to one embodiment. In the example shown by FIG. 7, the user device 160 receives a web page including video data from a destination site 170. Upon receiving the web page, the user device 160 loads 705 the web page. For example, the user device 160 processes data, such as a structured document, to display the web page from the destination site 170. While loading the web page, the user device 160 loads 710 a media player 115 included in the web page. For example, the user device 160 executes embed code included in the web page, causing the media player 115 to be loaded.

When the media player 115 has been loaded, the media player 115 establishes 715 a connection with the analytics engine 125 via the network 150. Using the established connection, the media player 115 transmits 720 various requests to the analytics engine 125. In one embodiment, the media player 115 transmits a request to the analytics engine 125 at predetermined intervals. For example, the media player 115 transmits a view progress request to the analytics engine 125 every 10 seconds when playing the video. In another embodiment, the media player 115 transmits a request to the analytics engine 125 responsive to an event occurring in the media player 115. For example, the media player 115 transmits a view end request to the analytics engine 125 in response to the completion of playing a video.

The analytics engine 125 stores 725 the requests in the analytics store 420. As the media player 115 transmits additional requests, the analytics engine 125 stores the additional requests. In addition to storing requests, the analytics engine 125 also stores web interaction data if the website maintained by the destination site 170 is also tracked by the analytics engine 125. However, even if the website maintained by the destination site 170 is not tracked by the analytics engine 125, the requests are stored to allow monitoring and analyzing interactions with video data.

To determine whether the website maintained by the destination site 170 from which the web pages are also tracked by the analytics engine 125, the media player 115 determines 730 whether a tracking cookie included in the web page matches a media player cookie associated with the media player 115. If a website is being tracked by the analytics engine 125, web pages comprising the web site include a tracking cookie. In one embodiment, the tracking cookie included in the web page is a first party cookie. For example, the tracking cookie is associated with a domain used by the destination site 170 to maintain the website. The tracking cookie included in a web page tracked by the analytics engine 125 includes a visitor identifier, a visit identifier, a user identifier and data associated with the web page.

However, the analytics engine 125 uses a third-party cookie for the media player cookie. The third-party media player cookie is associated with a domain that differs from the domain used by the destination site 170 to maintain the website. For example, the media player cookie is associated with a domain related to the analytics engine 125. By using a third-party cookie as the media player cookie, the analytics engine 125 allows access to the video data presented by the media player 115 to be tracked across different domains. Hence, the third-party media player cookie includes a user identifier that is the same across different websites that present the video data allowing data to be captured about interactions for video data even if the video data is copied to different websites.

Hence, to determine 730 if the tracking cookie matches the media player cookie, the media player 115 determines whether the user identifier of the tracking cookie matches the user identifier of the media player cookie. If the media player 115 determines that the tracking cookie matches the media player cookie, interactions with the web page are transmitted 735 from the user device 160 to the analytics engine 125 via the network 150. By determining if the user identifier of the tracking cookie and the user identifier of the media player cookie match, the media player 115 initially determines whether the website and the video data are commonly owned before transmitting web interaction data to the analytics server 125. Additionally, if the media player 115 determines that the user identifier of the tracking cookie and the user identifier of the media player cookie match, the media player 115 associates a session identifier with the tracking cookie and the media player cookie.

If web interaction data is received, the analytics server 125 stores 740 the web interaction data in the analytics store 420 and associates 745 the stored requests with the stored web interaction data. Thus, the analytics server 125 separately receives the web interaction data and the requests and then associates the web interaction data and the requests. For example, the analytics engine 125 associates requests and web interaction data using the session identifier associated with the tracking cookie and the media player cookie. Associating requests from the media player 115 and web interaction data using the session identifier allows the analytics store 420 to maintain data describing different sessions that include web interaction data and requests.

The reporting module 485 of the analytics engine 125 generates 750 a report based at least in part on an analysis of the web interaction data and the requests. For example, the reporting module 485 constructs charts, tables and statistics using video-aware analytics data generated from the web interaction data and event data included in the requests.

However, if the media player 115 determines 730 that the media player cookie does not match the tracking cookie, web interaction data is not transmitted to the analytics engine 125. For example, if the media player 115 determines that the user identifier of the tracking cookie does not match the user identifier of the media player cookie, web interaction data is not transmitted. Thus, even if the website from which the video data is accessed by the user device 160 is not being tracked by the analytics engine 125, the analytics engine 125 still stores 725 requests to enable tracking of interactions with video data.

Methods

Figure 8:
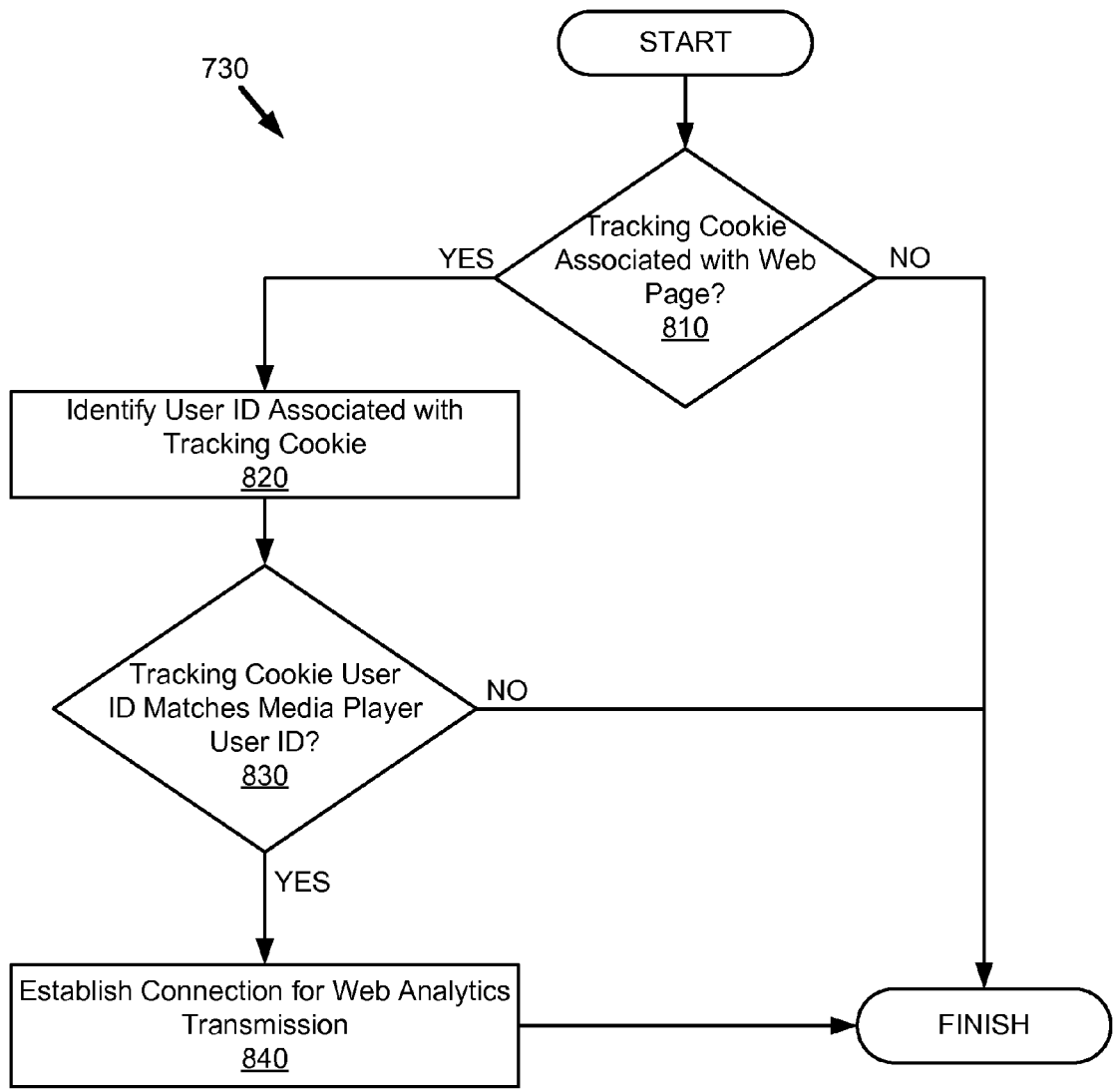
FIG. 8 is a flow diagram illustrating one embodiment of a method for determining whether a media player cookie matches a web page tracking cookie.

FIG. 8 is a flow diagram illustrating one embodiment of a method 730 for determining whether a media player cookie matches a web page tracking cookie. In one embodiment, the steps identified by FIG. 8 are performed by the media player 115 executing on the user device 160.

Initially, the media player 115 determines 810 whether a tracking cookie is associated with the web page in which the media player 115 is launched. For example, the media player 115 places a call to the web page to identify the web page tracking cookie. If no information identifying the web page tracking cookie is received from the web page or if the media player 115 is otherwise unable to identify the web page tracking cookie, the method ends. Accordingly, web interaction data is not transmitted to the analytics engine 125 because the web page is not being tracked by the analytics engine 125; however, requests from the media player 115 are transmitted to the analytics engine 125 to allow tracking of interactions for video data.

However, if the media player 115 determines 810 that a web page tracking cookie is associated with the web page, the media player 115 identifies 820 a user identifier ("user ID") associated with the web page tracking cookie. For example, the web page communicates the web page tracking cookie or data identifying the web page tracking cookie to the media player 115. The media player 115 then identifies 820 the user identifier associated with the web page tracking cookie. Alternatively, the web page identifies 820 the user identifier associated with the web page tracking cookie.

The media player 115 then determines 830 whether the user identifier associated with the web page tracking cookie matches a user identifier associated with the media player cookie. If the user identifier associated with the web page tracking cookie does not match a user identifier associated with the media player cookie, the method ends and web interaction data is not transmitted to the analytics engine 125. For example, if the user identifier associated with the web page tracking cookie differs from the media player cookie, the web page and the media player 115 are owned by different entities so that web interaction data is not transmitted. However, the requests from the custom media player 115 are transmitted to the analytics engine 125.

Responsive to the user identifier associated with the web page tracking cookie matching the user identifier associated with the media player cookie, the media player 115 initiates a command to establish 840 a connection between the user device 160 and the analytics engine 125. In one embodiment, the media player 115 associates a session identifier with the tracking cookie and the media player cookie. The session identifier is included with the web interaction data and the requests transmitted to the analytics engine 125. Associating a session identifier with the requests and the web interaction data allows the analytics engine 125 to associate the received web interaction data and requests with each other in a session that includes web interaction data and requests.

Figure 9A:
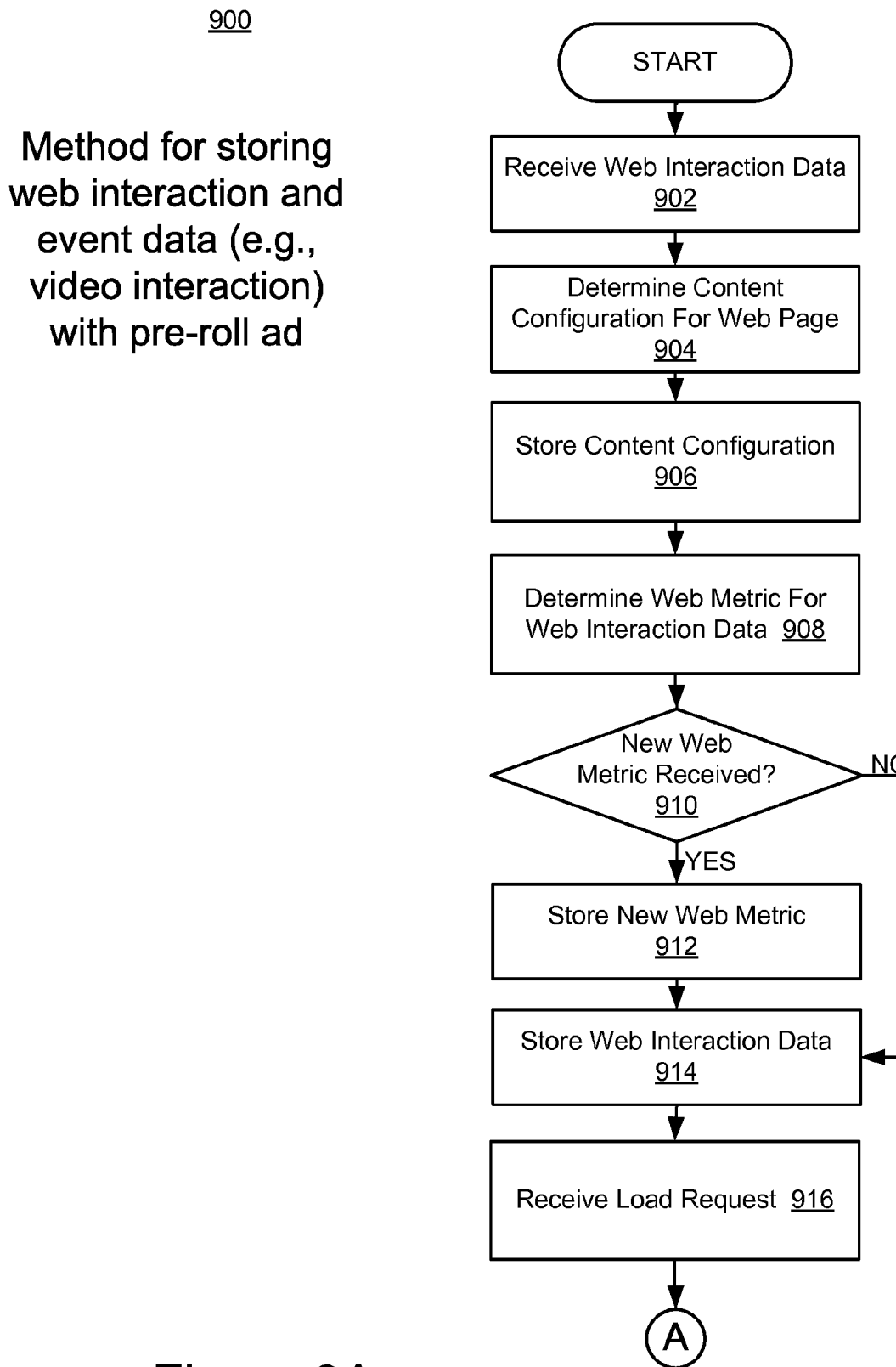
FIGS. 9A-9E are flow diagrams illustrating one embodiment of a method for capturing web interaction data and event data.

FIGS. 9A-9E are flow diagrams illustrating one embodiment of a method 900 for capturing web interaction data and event data. Turning to FIG. 9A, the communication module 460 receives 902 web interaction data from a web page loaded in a user device 160. In one embodiment, the web page is tracked by the analytics engine 125. The communication module 460 delivers the web interaction data to the configuration analysis module 467. The configuration analysis module 467 determines 904 a content configuration for the web page from the web interaction data. For example, the configuration analysis module 467 extracts an indication identifying a content configuration from the web interaction data and retrieves the content configuration from the storage device 314 in the CMS 110 using the indication. The configuration analysis module 467 stores 906 the content configuration in conjunction with the indication as a portion of configuration data 530 in the analytics store 420. The configuration analysis module 467 sends the web interaction data to the metric determination module 475.

The metric determination module 475 determines 908 a web metric for the web interaction data. In one embodiment, the metric determination module 475 determines 910 whether the determined web metric is a new web metric. For example, the metric determination module 475 maintains a list of web metrics and determines the web metric for the web interaction data as a new metric if the web metric is not included in the list. If the web metric is determined to be a new metric, the method 900 moves to step 912. Otherwise, the method 900 moves to step 914. At step 912, the metric determination module 475 stores 912 the new web metric in the metric categories 515 of the analytics store 420. For example, the metric determination module 475 adds the new web metric to the list of web metrics and stores the list in the metric categories 515 of the analytics store 420. The metric determination module 475 also stores 914 the web interaction data as a portion of interaction data 535 in the analytics store 420.

If a video is included in the web page, a load request is sent from a media player 115 embedded in the web page to the analytics engine 125 when the media player 115 for playing the video is loaded on a user device 160. The communication module 460 receives 916 the load request and delivers the load request to the request analysis module 470. In one embodiment, the communication module 460 delivers the load request to the configuration analysis module 467 and the configuration analysis module 467 determines a content configuration for the web page including the media player 115 for presenting the video. The configuration analysis module 467 associates the load request with the web interaction data related to the same content configuration for the same web page.

Figure 9B:
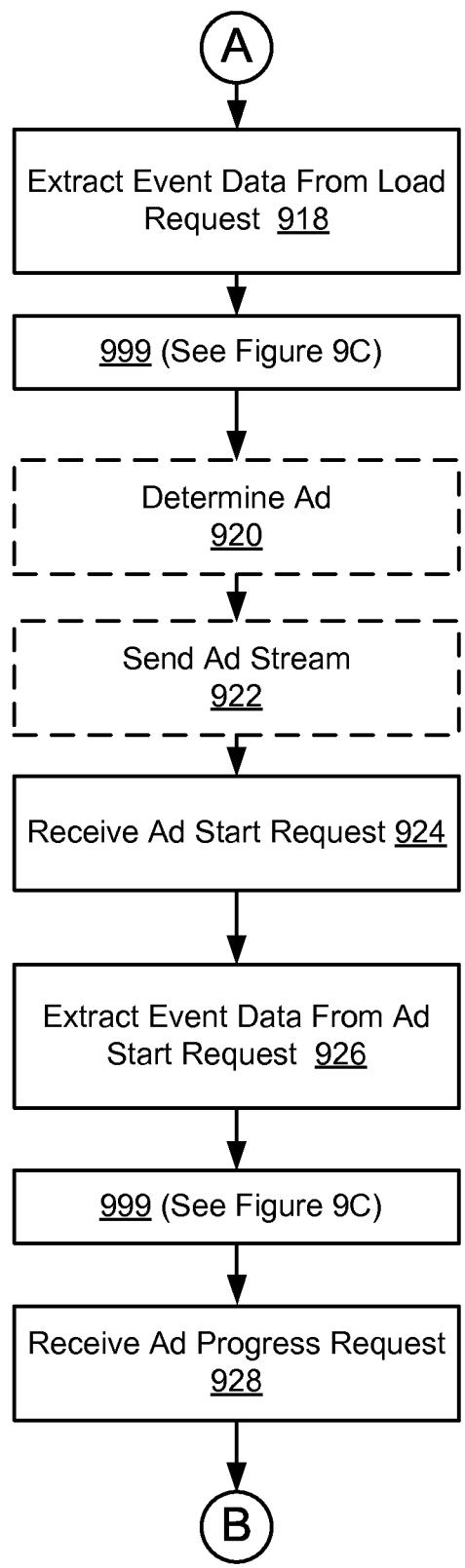

Turning now to FIG. 9B, the request analysis module 470 parses the load request and extracts 918 event data from the load request. For example, the request analysis module 470 determines a video ID, a video version, a URL for the video and event data included in the load request. The request analysis module 470 sends the event data to the metric determination module 475 and the method 900 moves to step 930 included in a sub-routine 999.

Figure 9C:
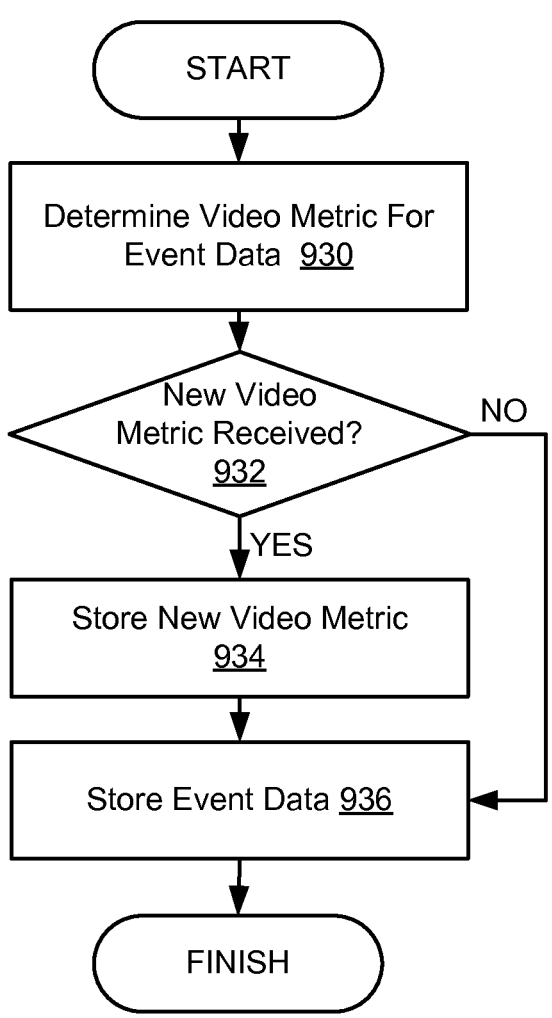

Referring to FIG. 9C, the sub-routine 999 is illustrated according to one embodiment. The metric determination module 475 receives the event data and determines 930 a video metric for the event data. In one embodiment, the metric determination module 475 determines 932 whether the video metric is a new video metric. For example, the metric determination module 475 maintains a list of video metrics and determines the video metric as a new video metric if the video metric is not included in the list. If a new video metric is received, the sub-routine 999 moves to step 934. Otherwise, the sub-routine 999 moves to step 936. At step 934, the metric determination module 475 stores the new video metric in the analytics store 420. For example, the metric determination module 475 adds the new video metric to the list of video metrics and stores the list in the analytics store 420. The metric determination module 475 also stores 936 event data in the analytics store 420.

Turning back to FIG. 9B, at step 920 the ad determination module 465 determines an ad to be played in the media player 115. For example, the ad determination module 465 retrieves an ad associated with the video from the ad storage 425. The ad determination module 465 sends 922 the data stream for the ad to the media player 115. Steps 920 and 922 are depicted using dashed lines to indicate that they are optional features of the method 900. In one embodiment, the media player 115 receives data stream for an ad from one of the third party ad server 190 and the ad server 140.

When the ad starts to play in the media player 115, the communication module 460 receives an ad start request from the media player 115 and delivers the ad start request to the request analysis module 470. In one embodiment, the communication module 460 sends the ad start request to the configuration analysis module 467 and the configuration analysis module 467 associates the ad start request to other requests and web interaction data associated with the same content configuration for the same web page.

The request analysis module 470 parses the ad start request and extracts 926 event data from the ad start request. The request analysis module 470 sends the event data to the metric determination module 475 and the method 900 moves to step 930 included in the sub-routine 999. The method 900 continues to execute steps included in the sub-routine 999 as described above. When the sub-routine 999 completes, the method 900 moves to step 928.

At step 928, the communication module 460 receives an ad progress request from the media player 115 at predetermined intervals and delivers the ad progress request to the request analysis module 470. In one embodiment, the communication module 460 sends the ad progress request to the configuration analysis module 467 and the configuration analysis module 467 associates the ad progress request to other requests and web interaction data associated with the same content configuration for the same web page.

Figure 9D:
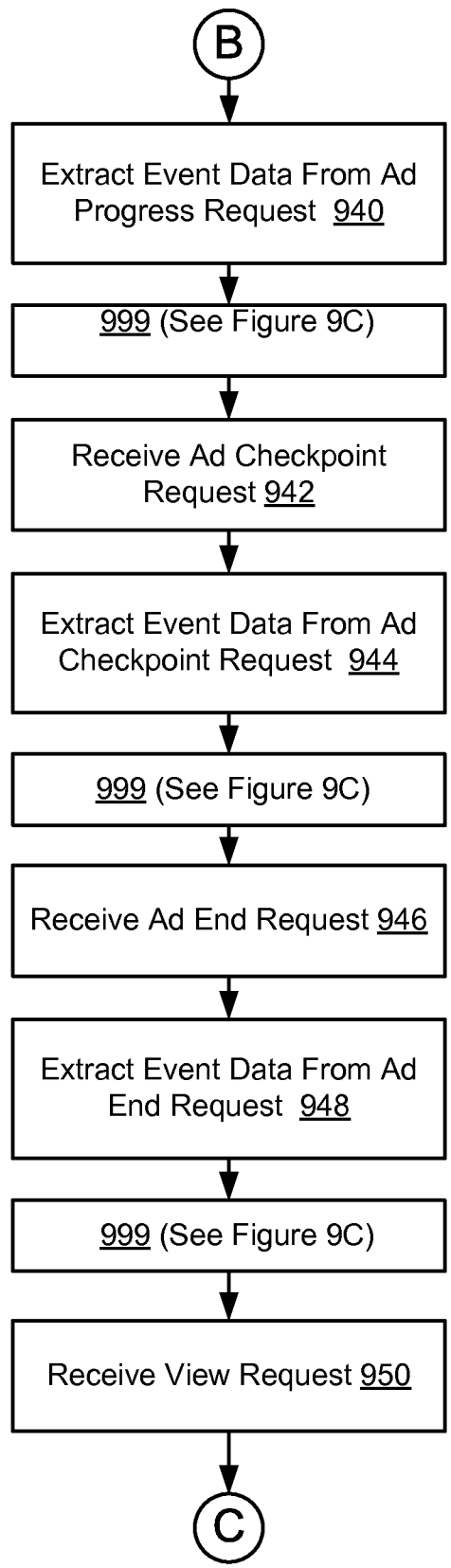

Turning to FIG. 9D, the request analysis module 470 parses the ad progress request and extracts 940 event data from the ad progress request. The request analysis module 470 sends the event data to the metric determination module 475 and the method 900 moves to step 930 included in the sub-routine 999. The method 900 continues to execute steps included in the sub-routine 999 as described above. When the sub-routine 999 completes, the method 900 moves to step 942.

At step 942, the communication module 460 receives an ad checkpoint request from the media player 115 at a checkpoint (e.g., 25%, 50%, 75% and 100% of the ad) and delivers the ad checkpoint request to the request analysis module 470. In one embodiment, the communication module 460 sends the ad checkpoint request to the configuration analysis module 467 and the configuration analysis module 467 associates the ad checkpoint request to other requests and web interaction data associated with the same content configuration for the same web page.

The request analysis module 470 parses the ad checkpoint request and extracts 944 event data from the ad checkpoint request. The request analysis module 470 sends the event data to the metric determination module 475 and the method 900 moves to step 930 included in the sub-routine 999. The method 900 continues to execute steps included in the sub-routine 999 as described above. When the sub-routine 999 completes, the method 900 moves to step 946.

At step 946, the communication module 460 receives an ad end request from the media player 115 and delivers the ad end request to the request analysis module 470. In one embodiment, the communication module 460 sends the ad end request to the configuration analysis module 467 and the configuration analysis module 467 associates the ad end request to other requests and web interaction data associated with the same content configuration for the same web page.

The request analysis module 470 parses the ad end request and extracts 948 event data from the ad end request. The request analysis module 470 sends the event data to the metric determination module 475 and the method 900 moves to step 930 included in the sub-routine 999. The method 900 continues to execute steps included in the sub-routine 999 as described above. When the sub-routine 999 completes, the method 900 moves to step 950.

At step 950, the communication module 460 receives a view request from the media player 115 indicating the video is starting to play and delivers the view request to the request analysis module 470. In one embodiment, the communication module 460 sends the view request to the configuration analysis module 467 and the configuration analysis module 467 associates the view request to other requests and web interaction data associated with the same content configuration for the same web page.

Figure 9E:
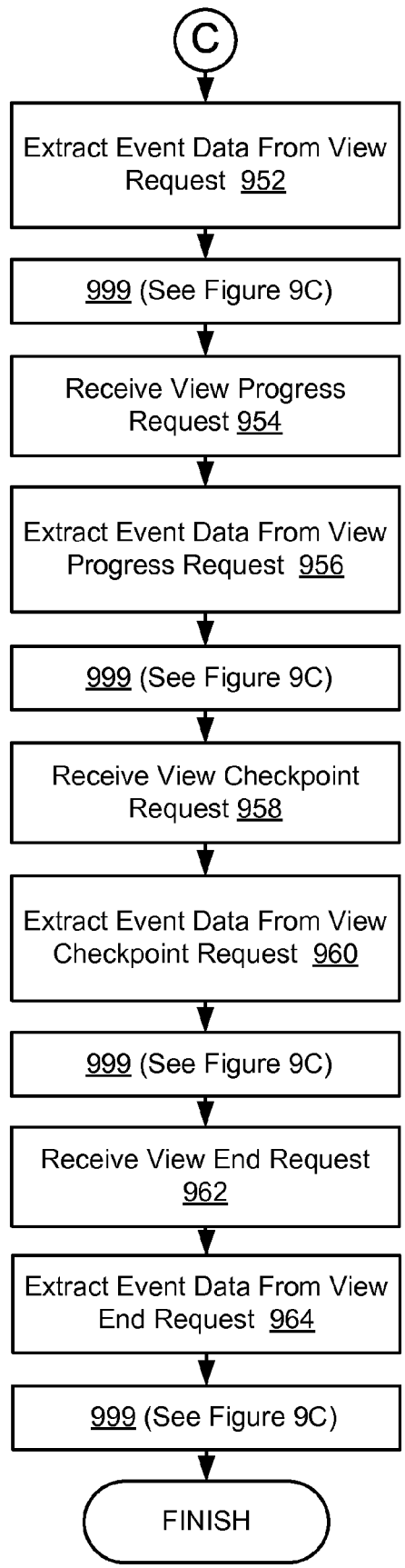

Turning now to FIG. 9E, the request analysis module 470 parses the view request and extracts 952 event data from the view request. The request analysis module 470 sends the event data to the metric determination module 475 and the method 900 moves to step 930 included in the sub-routine 999. The method 900 continues to execute steps included in the sub-routine 999 as described above. When the sub-routine 999 completes, the method 900 moves to step 954.

At step 954, the communication module 460 receives a view progress request from the media player 115 at predetermined intervals and delivers the view progress request to the request analysis module 470. In one embodiment, the communication module 460 sends the view progress request to the configuration analysis module 467 and the configuration analysis module 467 associates the view progress request to other requests and web interaction data associated with the same content configuration for the same web page.

The request analysis module 470 parses the view progress request and extracts 956 event data from the view progress request. The request analysis module 470 sends the event data to the metric determination module 475 and the method 900 moves to step 930 included in the sub-routine 999. The method 900 continues to execute steps included in the sub-routine 999 as described above. When the sub-routine 999 completes, the method 900 moves to step 958.

At step 958, the communication module 460 receives a view checkpoint request from the media player 115 at a checkpoint (e.g., 25%, 50%, 75% and 100% of the video) and delivers the view checkpoint request to the request analysis module 470. In one embodiment, the communication module 460 sends the view checkpoint request to the configuration analysis module 467 and the configuration analysis module 467 associates the view checkpoint request to other requests and web interaction data associated with the same content configuration for the same web page.

The request analysis module 470 parses the view checkpoint request and extracts 960 event data from the view checkpoint request. The request analysis module 470 sends the event data to the metric determination module 475 and the method 900 moves to step 930 included in the sub-routine 999. The method 900 continues to execute steps included in the sub-routine 999 as described above. When the sub-routine 999 completes, the method 900 moves to step 962.

If the video completes playing without abandonment, the communication module 460 receives 962 a view end request from the media player 115 and delivers the view end request to the request analysis module 470. In one embodiment, the communication module 460 sends the view end request to the configuration analysis module 467 and the configuration analysis module 467 associates the view end request to other requests and web interaction data associated with the same content configuration for the same web page.

The request analysis module 470 parses the view end request and extracts 964 event data from the view end request. The request analysis module 470 sends the event data to the metric determination module 475 and the method 900 moves to step 930 included in the sub-routine 999. The method 900 continues to execute steps included in the sub-routine 999 as described above. When the sub-routine 999 completes, the method 900 ends.

Figure 10A:
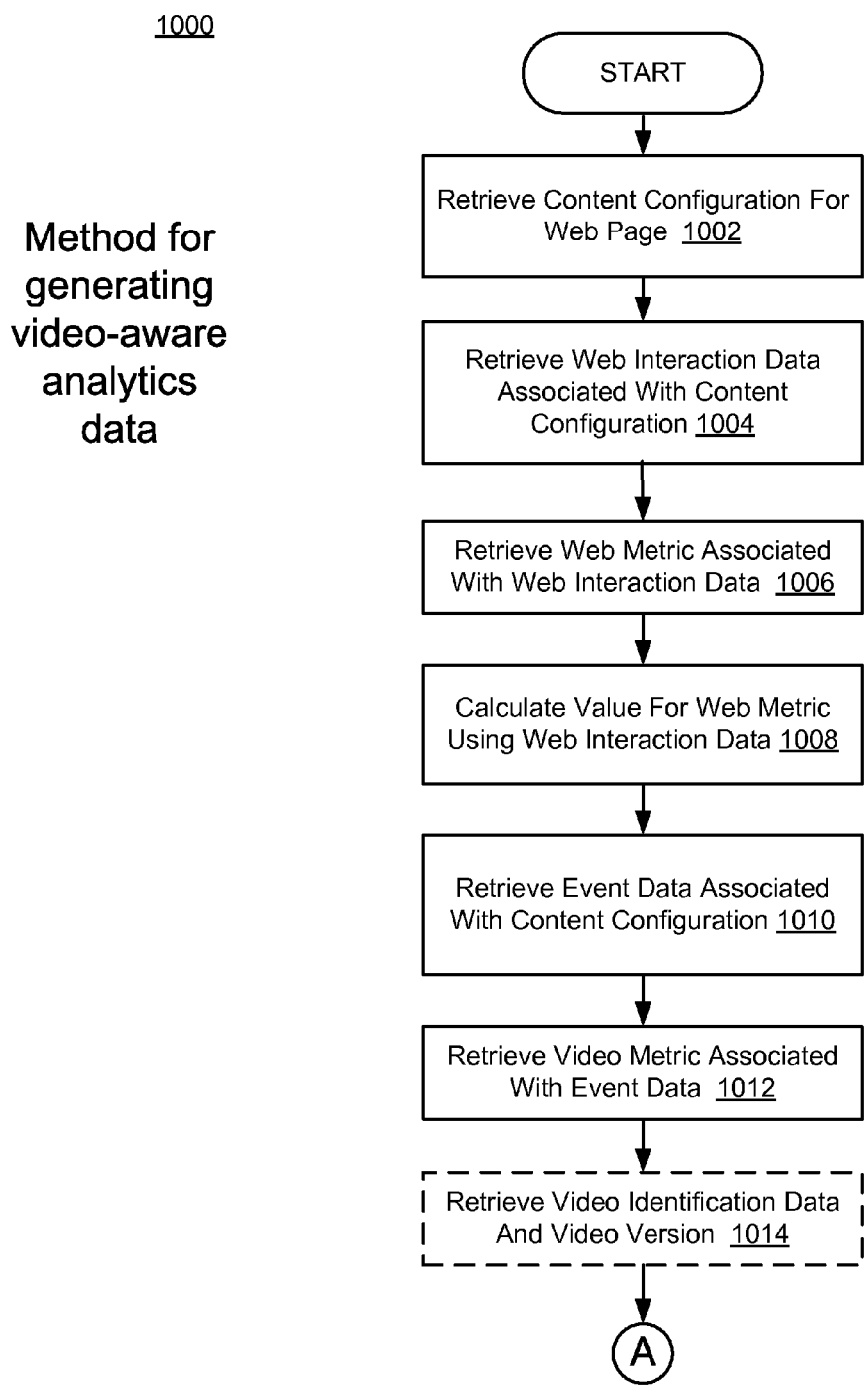
FIGS. 10A and 10B are flow diagrams illustrating one embodiment of a method for generating video-aware analytics data using web interaction data and event data.
Figure 10B:
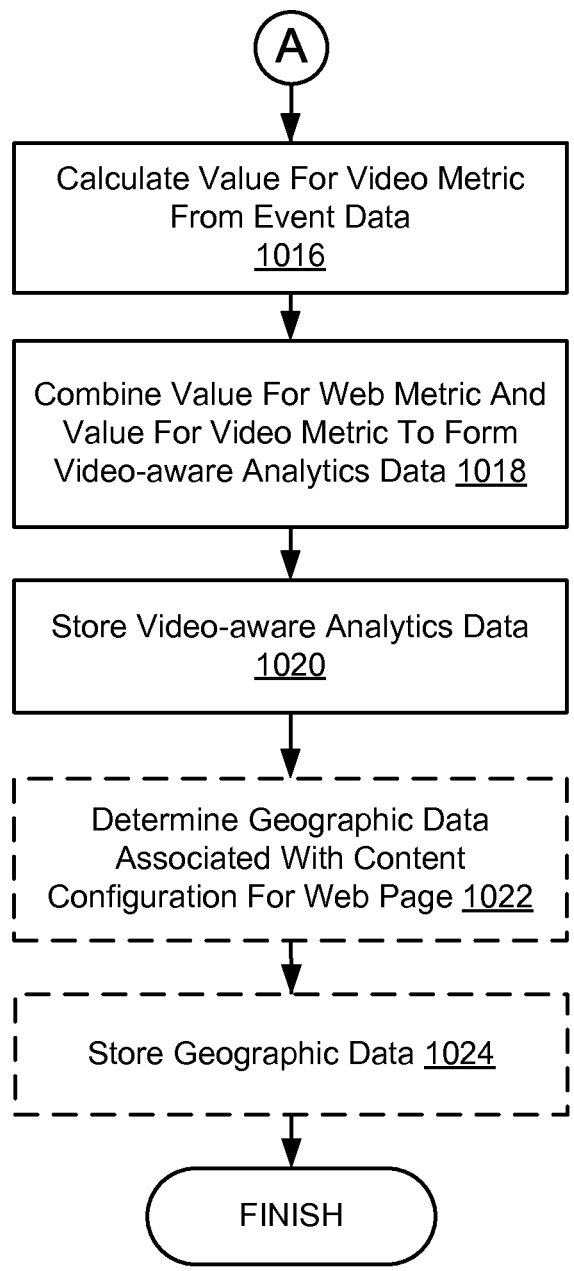

FIGS. 10A and 10B are flow diagrams illustrating one embodiment of a method 1000 for generating video-aware analytics data. Referring to FIG. 10A, the analytics module 480 retrieves 1002 a content configuration for a web page from the analytics store 420. The analytics module 480 also retrieves 1004 web interaction data associated with the content configuration. The analytics module 480 retrieves 1006 one or more web metrics associated with the web interaction data and calculates 1008 one or more values for the one or more web metrics using the web interaction data. For example, the analytics module 480 calculates values for page views and unique page views using the web interaction data.

The analytics module 480 retrieves 1010 event data associated with the content configuration for the web page from the analytics store 420. The analytics module 480 also retrieves 1012 one or more video metrics associated with the event data. Optionally, the analytics module 480 retrieves 1014 the video identification data and a video version for the video included in the web page.

Turning to FIG. 10B, the analytics module 480 calculates 1016 one or more values for the one or more video metrics using the event data. For example, the analytics module 480 calculates values for video views and unique video views from the event data. The analytics module 480 combines 1018 the one or more values for the one or more web metrics and the one or more values for the one or more video metrics to form video-aware analytics data. For example, the analytics module 480 generates video-aware analytics data describing that there are 1,000,000 page views for a web page in conjunction with 900,000 video views for a video included in the web page. The analytics module 480 stores 1020 the video-aware analytics data in the analytics store 420. Optionally, the analytics module 480 determines 1022 geographic data associated with the content configuration and stores 1024 the geographic data in the analytics store 420. For example, the analytics module 480 determines geographic information for user devices 160 that load the web page including the video according to the content configuration.

Figure 11A:
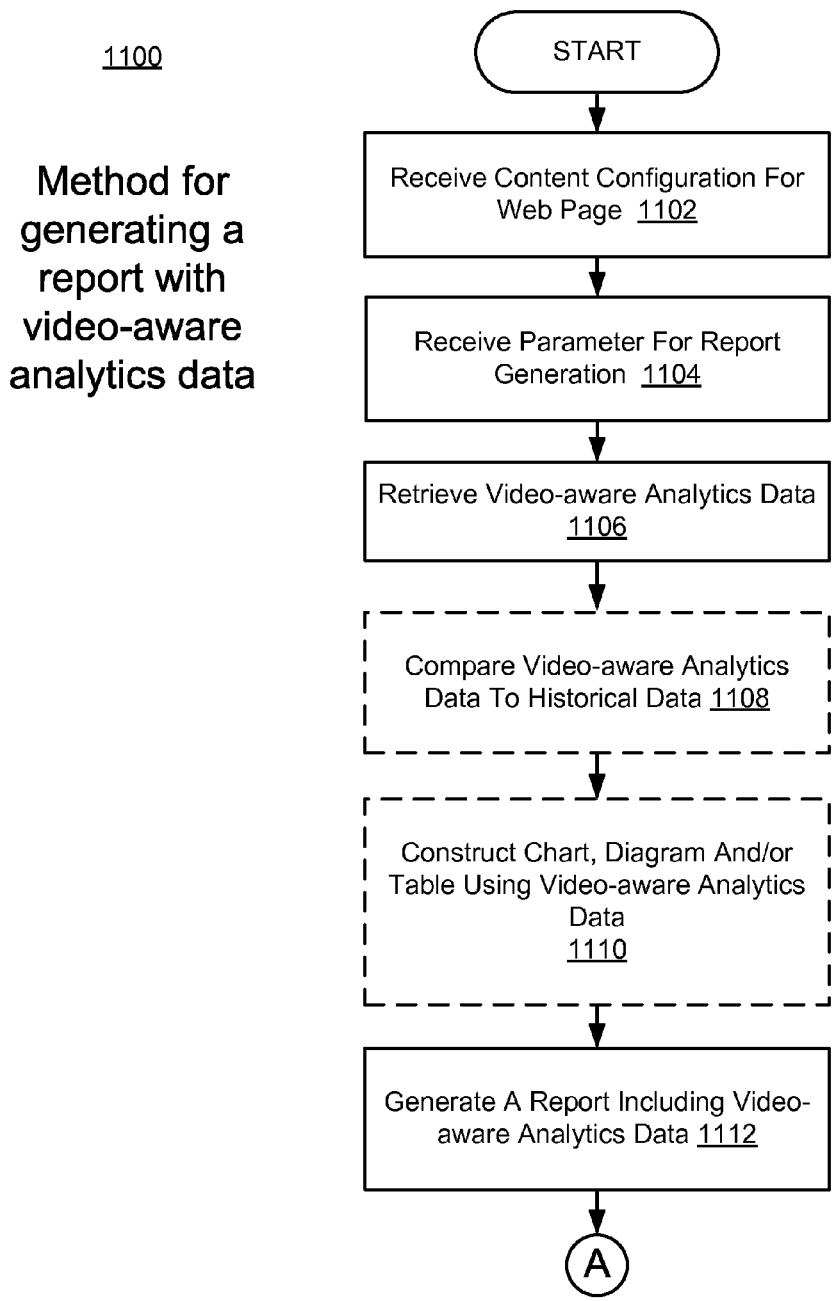
FIGS. 11A and 11B are flow diagrams illustrating one embodiment of a method for generating a report.
Figure 11B:
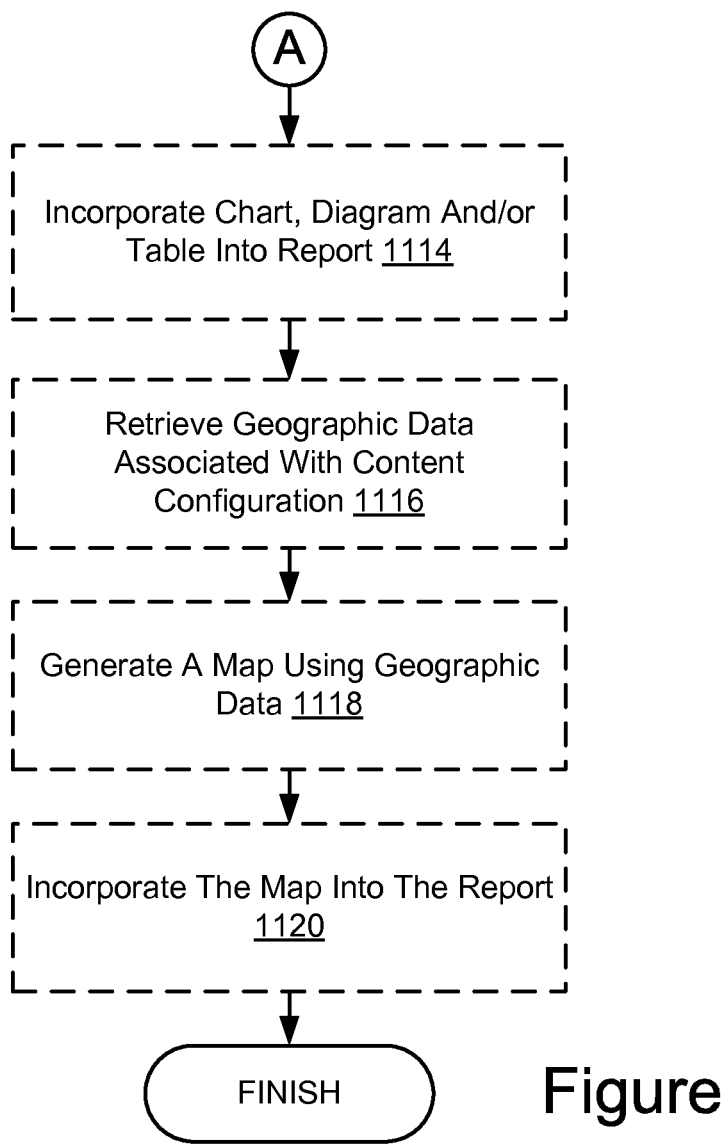

FIGS. 11A and 11B are flow diagrams of one embodiment of a method 1100 for generating a report. The reporting module 485 receives 1102 a content configuration for a web page from a user. For example, a user selects a content configuration for a web page from a list and sends the content configuration to the reporting module 485 so that the reporting module 485 generates a report corresponding to the content configuration. Additionally, the reporting module 485 receives 1104 one or more parameters from the user for generating the report. In one embodiment, the one or more parameters are one or more web metrics (session time, conversions, page views, unique page views, etc.) and/or one or more video metrics (e.g., video views, unique video views, etc.). The reporting module 485 retrieves 1106 video-aware analytics data using the one or more parameters from the analytics store 420. For example, if the parameters are page views and video views, the reporting module 485 retrieves the video-aware analytics data related to the page views and the video views such as the number for the page views and the number for the video views.

Optionally, the reporting module 485 compares 1108 the video-aware analytics data to historical data describing values for the same metrics in the past. For example, the reporting module 485 compares the number for video views in the last month to the number for video views in the month before the last month. Also optionally, the reporting module 485 constructs 1110 one or more of a chart, a diagram and a table using the video-aware analytics data. In one embodiment, the reporting module 485 constructs a chart, a diagram and/or a table according to the type of the report (e.g., a report focusing on video views, a report focusing on advertisements, etc.). The reporting module 485 generates 1112 a report including the video-aware analytics data.

Turning to FIG. 11B, the reporting module 485 generates the report by incorporating 1114 the one or more of the chart, the diagram and/or the table into the report. In one embodiment, the reporting module 485 arranges the chart, the diagram and/or the table according to a style selected by a user. In another embodiment, the reporting module 485 generates a report using a template for the arrangement of the chart, the diagram and/or the table.

In one embodiment, the reporting module 485 retrieves 1116 geographic data associated with the content configuration and generates 1118 a map describing the distribution of the video-aware analytics data according to the geographic data. For example, the reporting module 485 generates a map showing the distribution of page views and video views according to different states in the United States. The reporting module 485 incorporates 1120 the map into the report. Steps 1114-1120 are depicted using dashed lines to indicate that they are optional features of the method 1100.

Figure 12:
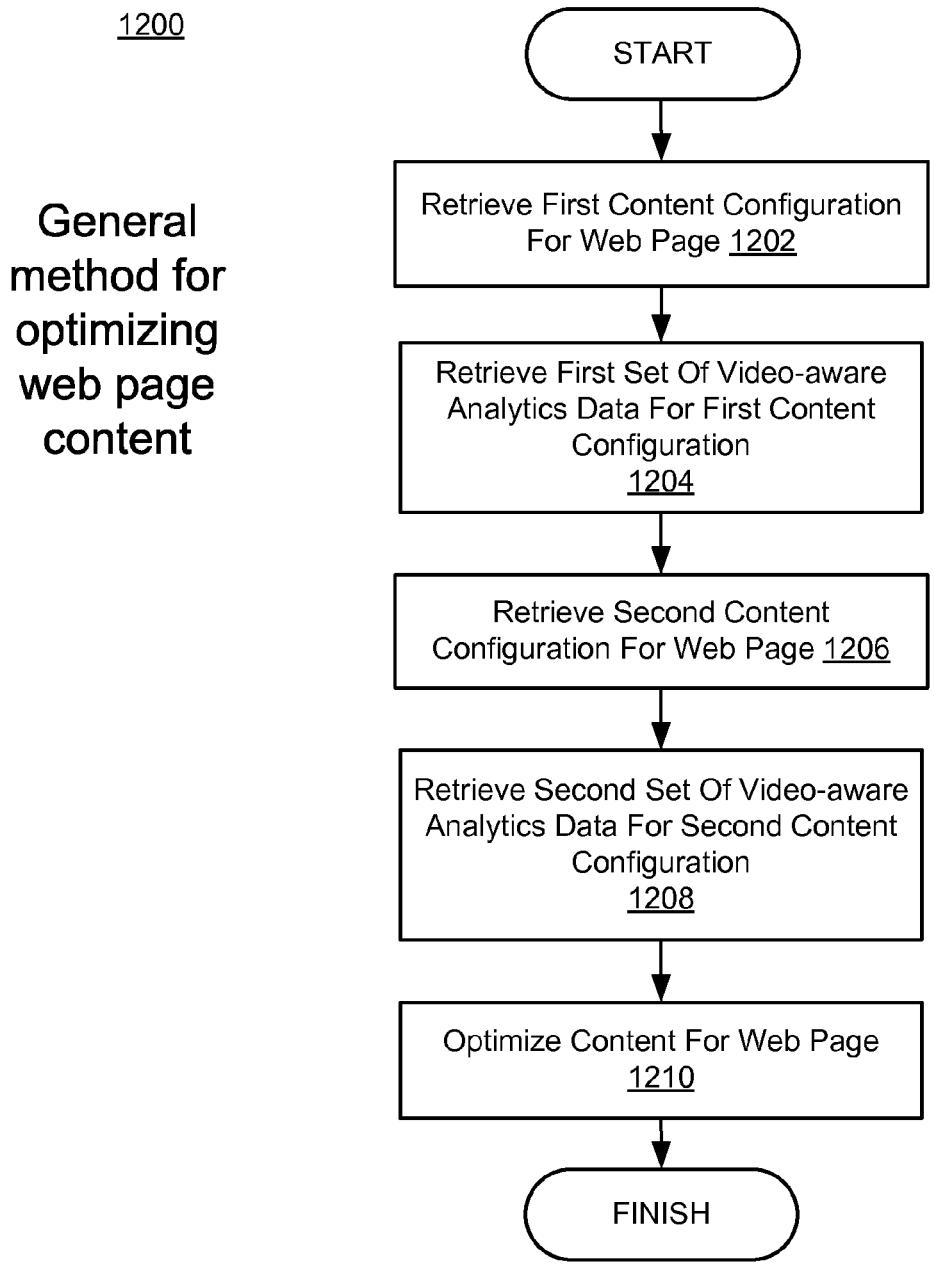
FIG. 12 is a flow diagram illustrating one embodiment of a method for optimizing content of a web page including a video.

FIG. 12 is a flow diagram of one embodiment of a method 1200 for optimizing content of a web page. The optimization module 483 retrieves 1202 a first content configuration for a web page from the configuration data 530 stored in the analytics store 420. The optimization module 483 retrieves 1204 a first set of video-aware analytics data associated with the first content configuration. Next, the optimization module 483 retrieves 1206 a second content configuration for the same web page from the configuration data 530. The optimization module 483 also retrieves 1208 a second set of video-aware analytics data for the second content configuration. The optimization module 483 optimizes 1210 content for the web page based at least in part on the first set and the second set of video-aware analytics data. For example, the optimization module 483 selects the first content configuration as an optimized content configuration for the web page if the first content configuration results in more conversions and a higher conversion rate than the second content configuration.

Figure 13A:
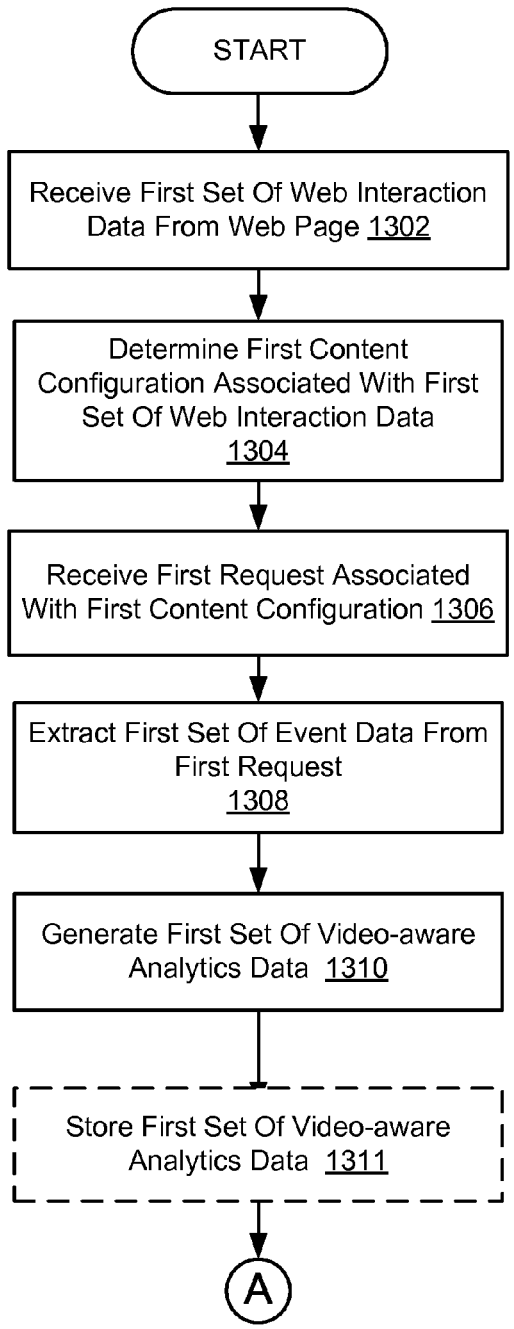
FIGS. 13A and 13B are flow diagrams illustrating another embodiment of a method for optimizing content of a web page including a video.
Figure 13B:
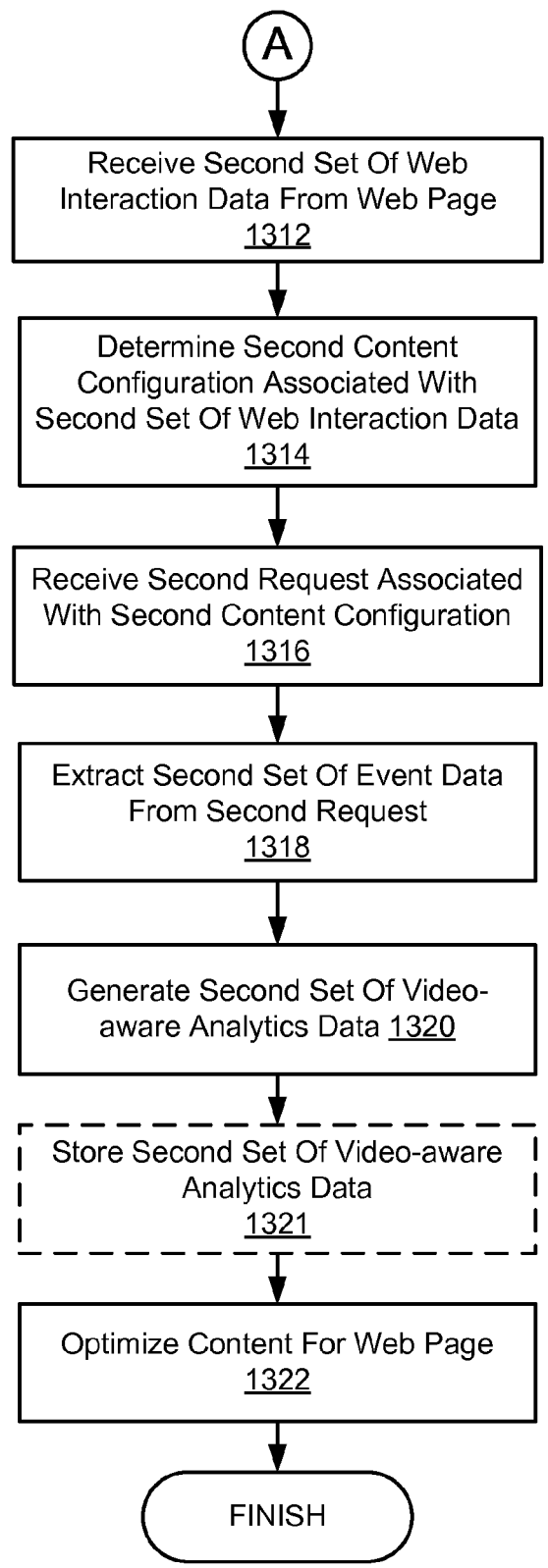

FIGS. 13A and 13B are flow diagrams of another embodiment of a method 1300 for optimizing content of a web page. Referring to FIG. 13A, the communication module 460 receives 1302 a first set of web interaction data from a web page loaded in one or more user devices 160 and sends the first set of web interaction data to the configuration analysis module 467. The configuration analysis module 467 determines 1304 a first content configuration associated with the first set of web interaction data. Additionally, the communication module 460 receives 1306 one or more first requests associated with the first content configuration from a media player 115 embedded in the web page and sends the one or more requests to the request analysis module 470. The request analysis module 470 extracts 1308 a first set of event data from the one or more first requests and sends the first set of event data to the analytics module 480.

The analytics module 480 generates 1310 a first set of video-aware analytics data using the first set of web interaction data and the first set of event data. For example, the metric determination module 475 determines one or more web metrics for the first set of web interaction data and one or more video metrics for the first set of event data. The analytics module 480 calculates values for the one or more web metrics and values for the one or more video metrics. The analytics module 480 combines the values for the one or more web metrics and the values for the one or more video metrics to form the first set of video-aware analytics data. The analytics module 480 sends the first set of video-aware analytics data to the optimization module 483. Optionally, the analytics module 480 stores 1311 the first set of video-aware analytics data in the analytics store 420.

Referring to FIG. 13B, the communication module 460 receives 1312 a second set of web interaction data from the web page loaded in one or more user devices 160 and sends the second set of web interaction data to the configuration analysis module 467. The configuration analysis module 467 determines 1314 a second content configuration associated with the second set of web interaction data. Additionally, the communication module 460 receives 1316 one or more second requests associated with the second content configuration for the web page and sends the one or more second requests to the request analysis module 470. The request analysis module 470 extracts 1318 a second set of event data from the one or more second requests and sends the second set of event data to the analytics module 480. The analytics module 480 generates 1320 a second set of video-aware analytics data using the second set of web interaction data and the second set of event data. The analytics module 480 sends the second set of video-aware analytics data to the optimization module 483. Optionally, the analytics module 480 stores 1321 the second set of video-aware analytics data in the analytics store 420.

The optimization module 483 optimizes 1322 content of a web page based at least in part on the first set and the second set of video-aware analytics data. For example, the optimization module 483 selects the first content configuration as an optimized content configuration for the web page if the first content configuration results in more conversions and a higher conversion rate than the second content configuration.

The foregoing description of the embodiments has been presented for the purposes of illustration and description. It is not intended to be exhaustive or to limit the present embodiments to the precise form disclosed. Many modifications and variations are possible in light of the above teaching. It is intended that the scope of the present embodiments be limited not by this detailed description, but rather by the claims of this application. As will be understood by those familiar with the art, the present embodiments may be embodied in other specific forms without departing from the spirit or essential characteristics thereof. Likewise, the particular naming and division of the modules, routines, features, attributes, methodologies and other aspects are not mandatory or significant, and the mechanisms that implement the present embodiments or its features may have different names, divisions and/or formats. Furthermore, as will be apparent to one of ordinary skill in the relevant art, the modules, routines, features, attributes, methodologies and other aspects of the present embodiments can be implemented as software, hardware, firmware or any combination of the three. Also, wherever a component, an example of which is a module, of the present embodiments is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the present embodiments are in no way limited to implementation in any specific programming language, or for any specific operating system or environment. Accordingly, the disclosure intended to be illustrative, but not limiting, of the scope of the embodiments, which is set forth in the following claims.

What is claimed is:

1. A method for optimizing content of a web page including a video, the method comprising:
    receiving a first set of web interaction data and a second set of web interaction data associated with a web page;
    determining a first content configuration associated with the first set of web interaction data and a second content configuration associated with the second set of web interaction data;
    receiving a first request and a second request from a media player, the first request associated with the first content configuration and the second request associated with the second content configuration;
    extracting a first set of event data from the first request and a second set of event data from the second request;
    generating a first set of video-aware analytics data based at least in part on the first set of web interaction data and the first set of event data and a second set of video-aware analytics data based at least in part on the second set of web interaction data and the second set of event data; and
    determining an optimized content configuration based at least in part on a comparison of the first set of video-aware analytics data and the second set of video-aware analytics data by:
        comparing the first set of video-aware analytics data to the second set of video-aware analytics data to generate a comparison result; and
        selecting one of the first content configuration and the second content configuration as the optimized content configuration for the web page based at least in part on the comparison result.

2. The method of claim 1 further comprising:
    generating a first report including the first set of video-aware analytics data and a second report including the second set of video-aware analytics data; and
    sending the first report and the second report to an administrator of the web page operating on a user device.

3. The method of claim 1 further comprising:
    determining a web metric associated with the first set of web interaction data and the second set of web interaction data and a video metric associated with the first set of event data and the second set of event data;
    determining a first value for the web metric based at least in part on the first set of web interaction data, a second value for the web metric based at least in part on the second set of web interaction data, a first value for the video metric based at least in part on the first set of event data and a second value for the video metric based at least in part on the second set of event data;
    generating the first set of video-aware analytics data by combining the first value of the web metric and the first value of the video metric; and
    generating the second set of video-aware analytics data by combining the second value of the web metric and the second value of the video metric.

4. The method of claim 1 further comprising:
    receiving a third set of web interaction data from the web page;
    determining a third content configuration associated with the third set of web interaction data;
    receiving a third request from the media player, the third request associated with the third content configuration;
    extracting a third set of event data from the third request;
    generating a third set of video-aware analytics data based at least in part on the third set of web interaction data and the third set of event data; and determining an optimized content configuration based at least in part on the first set of video-aware analytics data, the second set of video-aware analytics data and the third set of video-aware analytics data.

5. The method of claim 1 further comprising:
determining a first set of geographic data associated with the first configuration content and a second set of geographic data associated with the second configuration content; and
generating a first map describing distribution of the first set of video-aware analytics data based at least in part on the first set of geographic data and a second map describing distribution of the second set of video-aware analytics data based at least in part on the second set of geographic data.

6. The method of claim 5 further comprising:
generating a first report including the first map and a second report including the second map; and
sending the first report and the second report to an administrator of the web page operating on a user device.

7. A system for optimizing content of a web page including a video, the system comprising:
a communication module for receiving a first set of web interaction data and a second set of web interaction data from a web page, the communication module receiving a first request and a second request from a media player included in the web page;
a configuration analysis module communicatively coupled to the communication module, the configuration analysis module determining a first content configuration associated with the first set of web interaction data and a second content configuration associated with the second set of web interaction data;
a request analysis module communicatively coupled to the communication module, the request analysis module extracting a first set of event data from the first request and a second set of event data from the second request, wherein the first request is associated with the first content configuration and the second request is associated with the second content configuration;
an analytics module communicatively coupled to the configuration analysis module and the request analysis module, the analytics module generating a first set of video-aware analytics data based at least in part on the first set of web interaction data and the first set of event data and a second set of video-aware analytics data based at least in part on the second set of web interaction data and the second set of event data; and
an optimization module communicatively coupled to the analytics module, the optimization module determining an optimized content configuration based at least in part on a comparison of the first set of video-aware analytics data and the second set of video-aware analytics data by:
comparing the first set of video-aware analytics data to the second set of video-aware analytics data to generate a comparison result; and
selecting one of the first content configuration and the second content configuration as the optimized content configuration for the web page based at least in part on the comparison result.

8. The system of claim 7 further comprising:
a reporting module communicatively coupled to the analytics module, the reporting module generating a first report including the first set of video-aware analytics data and a second report including the second set of video-aware analytics data, the reporting module sending the first report and the second report to an administrator of the web page operating on a user device.

9. The system of claim 7 further comprising:
a metric determination module communicatively coupled to the configuration analysis module and the request analysis module, the metric determination module determining a web metric associated with the first set of web interaction data and the second set of web interaction data and a video metric associated with the first set of event data and the second set of event data; and
wherein the analytics module is further configured to:
determine a first value for the web metric based at least in part on the first set of web interaction data, a second value for the web metric based at least in part on the second set of web interaction data, a first value for the video metric based at least in part on the first set of event data and a second value for the video metric based at least in part on the second set of event data;
generate the first set of video-aware analytics data by combining the first value of the web metric and the first value of the video metric; and
generate the second set of video-aware analytics data by combining the second value of the web metric and the second value of the video metric.

10. The system of claim 7, wherein the communication module is further configured to receive a third set of web interaction data from the web page and a third request from the media player, the configuration analysis module is further configured to determine a third content configuration associated with the third set of web interaction data, the request analysis module is further configured to extract a third set of event data from the third request associated with the third content configuration, the analytics module is further configured to generate a third set of video-aware analytics data based at least in part on the third set of web interaction data and the third set of event data and the optimization module is further configured to determine an optimized content configuration based at least in part on the first set of video-aware analytics data, the second set of video-aware analytics data and the third set of video-aware analytics data.

11. The system of claim 7 further comprising:
a reporting module communicatively coupled to the analytics module, the reporting module generating a first map describing distribution of the first set of video-aware analytics data based at least in part on a first set of geographic data and a second map describing distribution of the second set of video-aware analytics data based at least in part on a second set of geographic data; and
wherein the analytics module is configured to determine the first set of geographic data associated with the first configuration content and the second set of geographic data associated with the second configuration content.

12. The system of claim 11, wherein the reporting module is further configured to:
generate a first report including the first map and a second report including the second map; and
send the first report and the second report to an administrator of the web page operating on a user device.

13. A computer program product comprising a non-transitory computer readable medium encoding instructions that, in response to execution by a computing device, cause the computing device to perform operations comprising:
receiving a first set of web interaction data and a second set of web interaction data associated with a web page;

determining a first content configuration associated with the first set of web interaction data and a second content configuration associated with the second set of web interaction data;

receiving a first request and a second request from a media player, the first request associated with the first content configuration and the second request associated with the second content configuration;

extracting a first set of event data from the first request and a second set of event data from the second request;

generating a first set of video-aware analytics data based at least in part on the first set of web interaction data and the first set of event data and a second set of video-aware analytics data based at least in part on the second set of web interaction data and the second set of event data; and determining an optimized content configuration based at least in part on a comparison of the first set of video-aware analytics data and the second set of video-aware analytics data by:

comparing the first set of video-aware analytics data to the second set of video-aware analytics data to generate a comparison result; and selecting one of the first content configuration and the second content configuration as the optimized content configuration for the web page based at least in part on the comparison result.

14. The computer program product of claim 13, wherein the computer readable medium encoding instructions when executed causes the computing device to perform operations comprising:

generating a first report including the first set of video-aware analytics data and a second report including the second set of video-aware analytics data; and sending the first report and the second report to an administrator of the web page operating on a user device.

15. The computer program product of claim 13, wherein the computer readable medium encoding instructions when executed causes the computing device to perform operations comprising:

determining a web metric associated with the first set of web interaction data and the second set of web interaction data and a video metric associated with the first set of event data and the second set of event data;

determining a first value for the web metric based at least in part on the first set of web interaction data, a second value for the web metric based at least in part on the second set of web interaction data, a first value for the video metric based at least in part on the first set of event data and a second value for the video metric based at least in part on the second set of event data;

generating the first set of video-aware analytics data by combining the first value of the web metric and the first value of the video metric; and generating the second set of video-aware analytics data by combining the second value of the web metric and the second value of the video metric.

16. The computer program product of claim 13, wherein the computer readable medium encoding instructions when executed causes the computing device to perform operations comprising:

receiving a third set of web interaction data from the web page;

determining a third content configuration associated with the third set of web interaction data;

receiving a third request from the media player, the third request associated with the third content configuration;

extracting a third set of event data from the third request;

generating a third set of video-aware analytics data based at least in part on the third set of web interaction data and the third set of event data; and determining an optimized content configuration based at least in part on the first set of video-aware analytics data, the second set of video-aware analytics data and the third set of video-aware analytics data.

17. The computer program product of claim 13, wherein the computer readable medium encoding instructions when executed causes the computing device to perform operations comprising:

determining a first set of geographic data associated with the first configuration content and a second set of geographic data associated with the second configuration content;

generates a first map describing distribution of the first set of video-aware analytics data based at least in part on the first set of geographic data and a second map describing distribution of the second set of video-aware analytics data based at least in part on the second set of geographic data;

generating a first report including the first map and a second report including the second map; and sending the first report and the second report to an administrator of the web page operating on a user device.

* * * * *